United States Patent
Gu et al.

(10) Patent No.: US 9,694,446 B2
(45) Date of Patent: Jul. 4, 2017

(54) WALL THICKNESS COMPENSATION DURING LASER ORIFICE DRILLING

(71) Applicant: Resonetics, LLC, Nashua, NH (US)

(72) Inventors: Rong Gu, Hudson, NH (US); David L. Wall, Burlington, MA (US); Sergey V. Broude, Newton, MA (US)

(73) Assignee: RESONETICS, LLC, Nashua, NH (US)

( * ) Notice: Subject to any disclaimer, the term of this patent is extended or adjusted under 35 U.S.C. 154(b) by 174 days.

(21) Appl. No.: 14/557,027

(22) Filed: Dec. 1, 2014

(65) Prior Publication Data

US 2016/0151114 A1 Jun. 2, 2016

(51) Int. Cl.
*A61B 18/20* (2006.01)
*B23K 26/384* (2014.01)
*B23K 26/70* (2014.01)

(52) U.S. Cl.
CPC ............ *B23K 26/384* (2015.10); *B23K 26/70* (2015.10)

(58) Field of Classification Search
CPC ....... B23K 26/00; B23K 26/70; B23K 26/384
USPC ....................................................... 264/400
See application file for complete search history.

(56) References Cited

U.S. PATENT DOCUMENTS

| 5,013,886 A | 5/1991 | Koegl et al. |
| 8,772,671 B2 | 7/2014 | Broude et al. |
| 2012/0000893 A1* | 1/2012 | Broude ................ B23K 26/032 219/121.69 |

\* cited by examiner

*Primary Examiner* — Gary Jackson
*Assistant Examiner* — Scott T Luan
(74) *Attorney, Agent, or Firm* — McLane Middleton, Professional Association

(57) ABSTRACT

Methods and systems for drilling precise orifices in a wall of non-uniform thickness are provided. In one aspect, a thickness profile of at least a portion of the wall is created and the wall is irradiated with at least one laser beam to ablate a portion of the wall to thereby form an orifice in the wall. During the irradiation, one or more parameters of the least one laser beam are adjusted one or more times in accordance with the thickness profile to compensate for the non-uniform thickness of the wall.

40 Claims, 18 Drawing Sheets

| Sample | A | B | C | D | E | F |
|---|---|---|---|---|---|---|
| 1 | 79 | 59 | 16 | 14 | 84 | 92 |
| 2 | 91 | 75 | 16 | 16 | 68 | 78 |
| 3 | 83 | 61 | 14 | 18 | 82 | 98 |
| 4 | 90 | 79 | 18 | 15 | 77 | 83 |
| 5 | 97 | 60 | 24 | 15 | 58 | 104 |

FIG. 8

WALL THICKNESS COMPENSATION DURING LASER ORIFICE DRILLING

BACKGROUND

Ablation is the removal of material from the surface of an object by vaporization, chipping, or other erosive processes. The term "ablation" is often used in the context of laser ablation, the process of removing material by irradiating it with a laser beam. At lower laser energy densities, the material is heated by the absorbed laser energy and melts, evaporates and/or sublimates. At high energy densities, the material is typically converted to gas or plasma and expands away from the surface. As a result, small fragments of the material in the form of gases, small liquid and/or solid droplets or particles are freed from the material and either carried away by a gas stream or re-deposited on a nearby surface.

Common parameters of the ablation process include (i) laser beam wavelength, (ii) laser pulse duration and (iii) laser beam fluence. Laser beam wavelength is an important factor because ablation requires sufficient absorption of the laser light by the material. Absorption wavelength characteristics are material-specific. Laser pulse duration is also an important parameter, as the mechanisms of ablation can vary substantially depending on the pulse length. Common pulse regimes include ultra-short (on the order of 10's of fsec to about 10 psec), very short (10 psec-1 nsec), short (1-200 nsec), long (1 µsec-1 msec) and continuous-wave (CW). Laser beam fluence refers to the measure of energy per unit area and is usually measured in $J/cm^2$. The higher the fluence, the more "cutting ability" a laser beam has. This parameter is particularly important because the laser beam fluence must exceed the specific threshold fluence value, $F_{th}$, of the material that the laser beam is going into for the laser to actually initiate the ablation process and remove material. Laser beam with a fluence below the $F_{th}$ threshold value will increase a material's temperature, but will not ablate it. Threshold fluence values are material-specific, wavelength-specific and pulse duration-specific.

Laser ablation is thus greatly affected by the nature of the material and its ability to absorb energy, requiring that at the wavelength of the laser the material has sufficient absorption to enable ablation. The depth over which the laser energy is absorbed, and thus the amount of material removed by a single laser pulse, depends on the material's optical properties at the laser wavelength. Laser pulses can vary over a very wide range of durations (milliseconds to femtoseconds) and fluences and can be precisely controlled.

Thus, laser ablation can be very valuable for both research and industrial applications. Laser ablation is often employed for precise material removal in the fabrication of advanced devices at the scale between microns and hundreds of microns and even at the scale of hundreds of centimeters, e.g., in case of solar panel fabrication. Both direct-write and mask-projection techniques are used, and laser wavelength is selected to be compatible with the materials being processed.

One important application of laser ablation is micromachining and, in particular, the drilling of small orifices having diameters of a size impossible to achieve using mechanical methods. Micromachining is especially useful for working with materials and devices incompatible with mechanical machining. For example, drilling one or more orifices with diameters between 10 and 100 µm in medical devices, such as balloon catheters, cannot be accomplished using convention mechanical machining. A balloon catheter is a type of flexible catheter with an inflatable "balloon" at its tip typically made of a thin (10-200 µm wall thickness) polymer material that is not conducive to mechanical machining. Balloon catheters are used during a catheterization procedure to enlarge a narrow opening or passage within the body and are often employed with drug-eluting balloons or embolic protection filters and used in medical procedures such as angioplasty, kyphoplasty and vertebroplasty.

The balloon itself may be any suitable shape, including without limitation, conical, spherical, cylindrical, zig-zag, tubular, curved, or bent. Some exemplary conventional balloon shapes are shown in FIG. 1. The diameter and length of a catheter balloon may range from a few millimeters to several centimeters, depending on the application. The wall thickness of the balloon typically ranges from 10 to 200 µm. The examples shown in FIG. 1 illustrate the broad spectrum of possible configurations.

In some applications, catheter balloons may be used to dispense and/or collect liquid, in which case one or more orifices must be provided along the body of the balloon. FIG. 2 illustrates a prior art conical balloon having multiple orifices uniformly positioned about the left side of the balloon. FIG. 3 shows a prior art cylindrical balloon 20 having multiple orifices 22 uniformly positioned about a middle portion of the balloon. The diameter of these orifices may range from about 5 to about 200 µm. It is known among those having ordinary skill in mechanical engineering and/or fluid dynamics that the flow rate of a liquid through an orifice can be determined and/or dictated by the size or diameter of the orifice when all other parameters are held constant. Accordingly, the amount of fluid needed in a particular medical application can be precisely administered and controlled by using a balloon that has precisely-manufactured orifices. It will be understood by a person of ordinary skill in the art that manufacturing such orifices in these catheter balloons, or any other device made of "soft" material, to the exact and required dimensions is virtually impossible to accomplish using mechanical machining techniques today.

Alternatively, laser ablation may be employed for precisely drilling orifices in thin flexible materials. Two primary laser ablation techniques useful for drilling applications include mask-projection and beam direct-write. Common parameters of the laser drilling process include (i) laser wavelength, (ii) laser pulse energy, (iii) laser pulse duration, (iv) laser pulse repetition rate, (v) the number of laser pulses delivered, (vi) laser spot size and shape as delivered to the work piece, (vii) laser beam energy density as delivered to the work piece and (viii) the path and velocity of the scanning beam on the work piece. Common pulse regimes include ultra-short (10's of fsec-10 psec), very short (10 psec-1 nsec), short (1-200 nsec), long (1 µsec-1 msec) and continuous-wave (CW).

In conventional laser ablation methods and systems, the orifices formed in a work piece by laser drilling are generally not exactly cylindrical in their cross-section. As shown in FIG. 4, an orifice (10) is characterized by an entrance diameter, $D_{entrance}$, located along an outside surface (12) of a wall (11) a work piece and an exit diameter, $D_{exit}$, located along an inside surface (13) of the wall (11), wherein $D_{entrance}$ and $D_{exit}$ are different. As a result of this difference, a taper angle is formed, as shown in FIG. 4. For a given set of operating parameters of a laser drilling system and a given material, $D_{entrance}$ and the taper angle are usually defined, while $D_{exit}$ will depend on the thickness, w, of the wall (11) of the work piece. The flow rate of liquid through the orifice

(10) is mostly dependent upon $D_{exit}$. Thus, precisely controlling the amount of liquid that flows through orifice (10) requires controlling the exit diameter, $D_{exit}$, to the exact, called-for dimension.

It is also well-known to those of ordinary skill in the art that current manufacturing methods (e.g., extrusion, thermal-forming and injection molding) for fabricating soft-material devices, such as catheter balloons, are unable to precisely and consistently control the wall thickness, w, of such devices, either (i) when transitioning between differently-sized sections of the same device, (ii) from one device to another in the same manufacturing run and/or (iii) between different manufacturing runs. By way of example, FIG. 5 illustrates a catheter balloon having uniform wall thickness, while FIG. 6 shows a catheter balloon having varying wall thickness. Because the size of the exit diameter, $D_{exit}$, depends upon the thickness, w, of the wall of a work piece, as stated above, it is very difficult to precisely machine the exit diameter, $D_{exit}$, in a catheter balloon, or other soft-material device, having a non-uniform wall using pre-selected drilling parameters. By selecting such parameters ahead of time, the laser drilling operation cannot account for the numerous adjustments needed to be made in response to the varying thickness of the wall of the balloon. Accordingly, there is a need in the art for methods and systems of drilling precisely-controlled orifices in a soft-material wall of non-uniform thickness.

SUMMARY

Embodiments of the present disclosure provide methods and systems directed to drilling one or more precisely-sized orifices in the wall of a work piece made of a thin flexible material, such as a balloon catheter, using laser ablation techniques. The term "work piece" as used herein includes without limitation any type of device or component of a device that is comprised of a soft material, such as a thin polymer substance, that is not conducive to mechanical machining.

Some embodiments may be directed to methods for drilling precise orifices in a wall of non-uniform thickness. In some embodiments, the methods involve creating a thickness profile of at least a portion of the wall. According to some methods, the wall may be irradiated with at least one laser beam to ablate a portion of the wall to thereby form an orifice in the wall, wherein during the irradiation one or more parameters of the least one laser beam are adjusted one or more times in accordance with the thickness profile to compensate for the non-uniform thickness of the wall. In some embodiments, the one or more parameters may be selected from the group consisting of the number of pulses delivered to the wall, the duration of laser exposure to the wall, the laser pulse repetition rate, the laser energy, the laser beam fluence, the size of the focused laser beam on target and the size of the image projected on the target.

Method embodiments of the present disclosure for drilling precise orifices in a wall of non-uniform thickness may also include irradiating at least a portion of the wall with at least one laser beam. In some of these embodiments, the method may involve monitoring localized areas of the wall during a first time period of the irradiation to determine one or more thicknesses of the wall in those localized areas. Further, some methods may continue to irradiate the wall during a second time period, such that during the second time period of irradiation one or more parameters of the least one laser beam may be adjusted one or more times in accordance with one or more thicknesses determined during the first time period of irradiation to compensate for the non-uniform thickness of the wall. In some preferred embodiments, monitoring the irradiation of the wall during a first time period of the irradiation may involve detecting and/or analyzing an acoustic signature emitted from the wall.

Method embodiments of the present disclosure for drilling precise orifices in a wall of non-uniform thickness may further include irradiating at least a portion of the wall with at least one laser beam to form one or more sub-sized orifices in the wall. Moreover, according to some embodiments, methods may involve detecting when the at least one laser beam has fully penetrated through the wall to form one sub-sized orifice and thereafter determining the thicknesses of the wall based on when the at least one laser beam fully penetrated the wall. In some methods, one or more parameters of the at least one laser beam may be adjusted during irradiation of the wall and in accordance with the determined thicknesses to compensate for the non-uniform thickness of the wall. Some methods may accomplish detection using a technique selected from the group consisting of monitoring the ablation plume and detecting acoustical signals associated with ablation shock waves.

Method embodiments of the present disclosure for drilling precise orifices in a wall of non-uniform thickness may also include irradiating at least a portion of the wall with at least one laser beam to form one or more orifices in the wall. Some embodiments may include monitoring the irradiation of the wall and/or measuring an exit diameter of the one or more orifices. In some embodiments, one or more parameters of the at least one laser beam may be adjusted during irradiation of the wall in accordance with one or more of the measurements of the exit diameters of the one or more orifices to accommodate the non-uniform thickness of the wall. In addition, some methods of monitoring the irradiation of the wall may specifically include using automated vision techniques.

Method embodiments of the present disclosure may be executed using instrumentation well-known to persons having ordinary skill in the art, including laser emitting devices, sensors, image capturing devices, computers, and/or computer networks. To this end, the present invention also contemplates system embodiments directed to drilling precise orifices in a wall of non-uniform thickness. Some embodiments may be directed to a system having a computer-controlled laser workstation for automatically performing one or more of the following: (i) installing a new part in the workstation, (ii) mapping the wall thickness of one or more sections of a work piece, (iii) prescribing optimal operating laser parameters for each section of the work piece that is be processed and/or (iv) laser drilling one or more of mapped sections of the work piece to provide orifices having precisely-machined exit diameters.

Some system embodiments may include a laser emitting device for irradiating one or more layers of material to be removed from a work piece, a detector configured for detecting one or more characteristics of the material of the work piece itself or of the laser ablation process and a computer system for receiving information from the detector regarding the one or more characteristics of the laser ablation. The computer algorithm may be capable of, according to some embodiments, automatically detecting the wall thickness of the work piece.

In one aspect, a method for drilling precise orifices in a wall of non-uniform thickness includes creating a thickness profile of at least a portion of the wall. The wall is irradiated with at least one laser beam to ablate a portion of the wall to thereby form an orifice in the wall. During the irradiation, one or more parameters of the least one laser beam are adjusted one or more times in accordance with the thickness profile to compensate for the non-uniform thickness of the wall.

In a further aspect, a method for drilling one or more orifices in a work piece having a wall of non-uniform thickness comprises retrieving data representative of a thickness profile of at least a portion of the wall and processing the retrieved data to generate a table of one or more laser operation parameters. The laser operation parameters are selected to compensate for variations in the thickness profile. A laser is controlled to generate a laser beam and the wall is irradiated with the laser beam to ablate a portion of the wall to thereby form an orifice in the wall. The laser beam is controlled in accordance with the generated table of laser operating parameters to compensate for the non-uniform thickness of the wall.

In yet another aspect, a method for drilling precise orifices in a wall of non-uniform thickness comprises irradiating at least a portion of the wall with a laser beam during a first time period and monitoring localized areas of the wall during the first time period to determine one or more thicknesses of the wall in the localized areas. Irradiation of the wall continues during a second time period. During the second time period, one or more parameters of the laser beam are adjusted one or more times in accordance with the one or more thicknesses determined during the first time period to compensate for the non-uniform thickness of the wall.

In still another aspect, a method for drilling a precise orifice in a wall of non-uniform thickness comprises ablating a location of the wall by operating a laser with a first set of one or more operating parameters to irradiate the location with a laser beam and detecting one or more characteristics of the ablation. The ablation characteristics are monitored to determine whether the laser beam has fully penetrated the wall to form a sub-sized orifice having an exit diameter less than a predetermined exit diameter. Once the laser beam has fully penetrated the wall to form the sub-sized orifice, a thickness of the wall at the location is determined based the first set of operating parameters. The laser is operated with a second set of one or more operating parameters in accordance with the determined thicknesses to compensate for the non-uniform thickness of the wall.

In another aspect, a method for drilling precise orifices in a wall of non-uniform thickness comprises irradiating at least a portion of the wall with a laser beam to form one or more orifices in the wall and, at periodic time intervals, measuring an exit diameter of the one or more orifices. One or more parameters of the at least one laser beam are adjusted during the irradiation in accordance with one or more measurements of the exit diameters of the one or more orifices to accommodate the non-uniform thickness of the wall.

In still another aspect, a system for drilling precise orifices in a work piece having a wall of non-uniform thickness comprises a laser for irradiating at least a portion of the wall and a processor having a program of instructions thereon configured to control one or more operating parameters of the laser. The program of instructions is further configured to identify non-uniformities in the wall thickness and to adjust the one or more operating parameters to compensate for the non-uniform in the thickness of the wall.

Embodiments described herein can be realized through specific software or hardware contained with a laser emitting device, computer and/or any other instrumentation needed to achieve the objectives of the present invention. By way of example only, the computer may contain software design to instruct a detector to collect and send data regarding the laser ablation process back to the computer for analysis. In some embodiments, the software may further analyze the data and automatically determine whether the ablation process should be terminated. In other embodiments, the software may provide a user interface for an operator to review the data and provide input as to whether the ablation process should be continued or terminated.

BRIEF DESCRIPTION OF THE FIGURES

FIG. 8 is a table showing sample thickness data taken at the axial positions A through F of five samples of the catheter shown in FIG. 7.

DETAILED DESCRIPTION OF THE PREFERRED EMBODIMENTS

The present disclosure describes various methods and systems of using laser ablation techniques to precisely machine orifices, particularly exit diameters of orifices, in thin-walled devices, such as a catheter balloon. The various embodiments disclosed herein can be used in isolation or in combination with one another. Each method and system embodiment can also be configured for a specific application or applied to a particular device. While the description herein may reference specific devices, such as a balloon catheter, any such reference has been provided merely as an example and in no way limits the scope of the present disclosure to specific configurations or devices. The present disclosure will be described herein primarily by way of reference to drilling orifices having a precisely controlled exit diameter. It will be recognized, however, the present system and method are equally applicable to drilling orifices having a precisely controlled entrance diameter.

The present invention discloses methods and systems for manufacturing precisely-controlled orifices in thin walls of devices having non-uniform wall thicknesses. Embodiments of the present invention provides these orifices by using any one of the following four techniques, either alone or in any desired combination—(i) pre-mapping the wall thickness; (ii) local wall thickness monitoring, (iii) preliminary drilling of sub-sized orifices and (iv) constant monitoring of exit diameters.

Method 1—Predetermining a Wall Thickness Profile

Some embodiments of the present invention provide for a system and method that involves pre-processing mapping of the wall thickness of a work piece in those sections of the work piece where drilling is to be performed. By predetermining the specific wall thicknesses, w, for each section of the work piece being machined, the various parameters of the laser can be adjusted during the drilling process to accommodate differences in wall thickness, w. Because the profile of the wall's thickness has been predetermined, the laser's operating parameters may be adjusted in synchronization with changes in the thickness profile of the wall.

Figure 10:
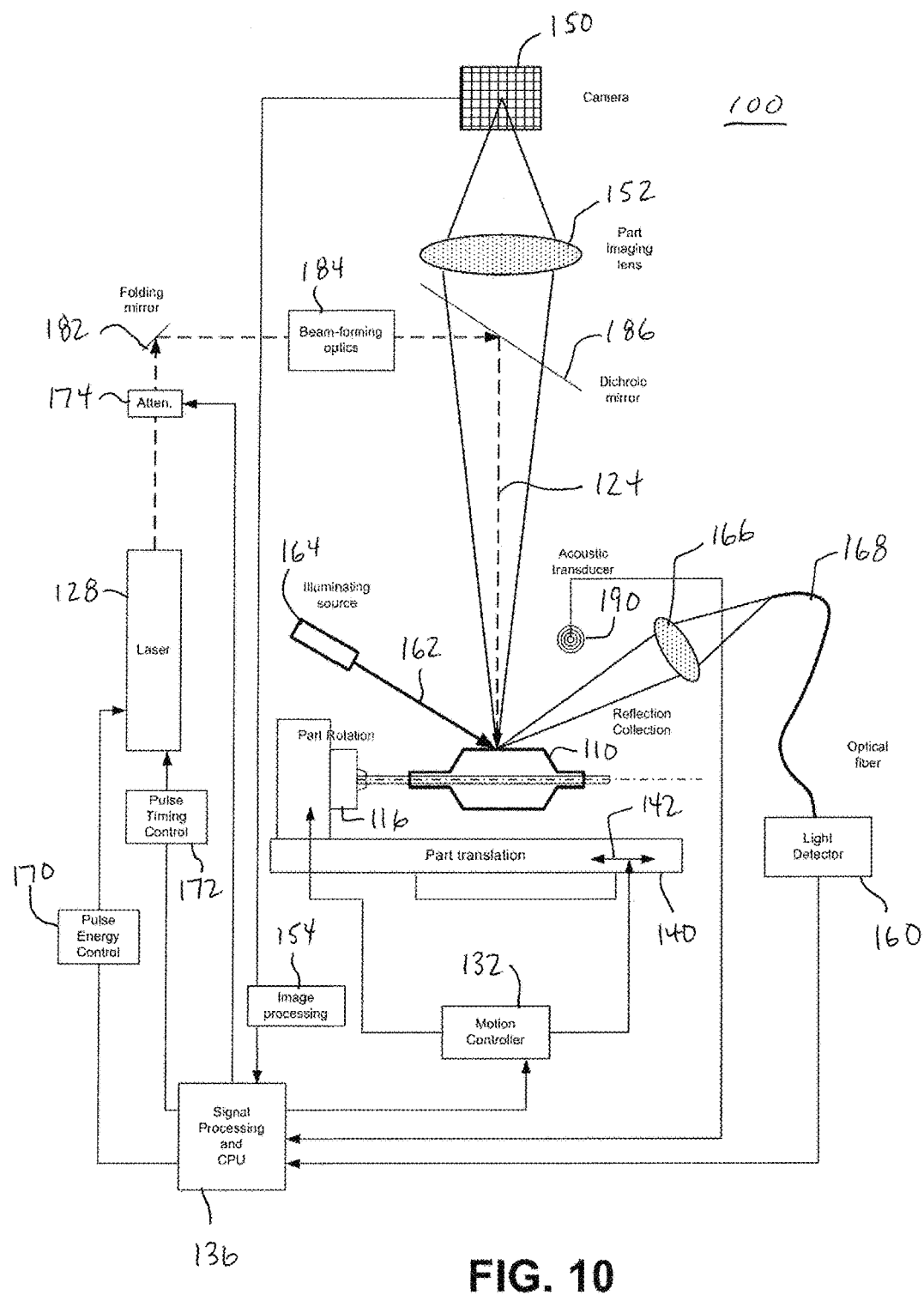
FIG. 10 is a block diagram illustrating a laser machining apparatus in accordance with an exemplary embodiment of the present invention.

The methods of the present disclosure may be implemented in a computer-controlled laser workstation, an exemplary embodiment of which is illustrated in FIG. 10, so that method steps may be automatically performed under programmed control. Depending on the embodiment, such method steps may include, without limitation, (i) installing a new part in the workstation, (ii) mapping the wall thickness of one or more sections of a work piece, (iii) prescribing optimal operating laser parameters for each section of the work piece that is be processed and (iv) laser drilling one or more of mapped sections of the work piece to provide orifices having precisely-machined exit diameters.

Referring now to FIG. 10, there appears a schematic block diagram of an exemplary system 100 for the drilling of orifices in a work piece 110 or other thin walled work piece. The work piece 110 is generally hollow and is supported on an axial support member or spindle 112. An end of the spindle 112 is disposed in a rotatable collet or chuck 116 of a rotary positioning system 120 for positioning the work piece at a desired rotational position relative to a laser beam 124 generated by a laser 128. The rotary positioning system 120, in turn, is supported on a movable platform 140, which is movable back and forth in the axial direction 142, i.e., parallel to the rotational axis of the spindle 112.

The rotational position of the system 120 and axial position of the platform 140 relative to the laser beam 124 is controlled by a motion controller 132 based on a program of instructions executed by a CPU or other computer based information handling system 136. The motion controller 132 is configured to drive the moveable platform 140 and the rotary positioning system 120 to irradiate the work piece 110 at the desired positions to drill the orifices at the desired positions or pattern on the work piece.

It will be recognized that other methods for providing the relative axial movement between the laser beam 124 and the work piece 110 are contemplated. For example, the laser 128 could be mounted to a moveable platform that is movable in the axial direction. Alternatively, a moveable mirror or other beam steering optics may be provided, e.g., which may be translatable and/or pivotable, to direct the laser beam 124 to a desired axial position on the work piece 110.

The system 100 illustrated in FIG. 10 is especially suited for drilling orifices in a work piece wherein optical path of the laser beam 124 is generally normal to the surface of the workpiece at the target location, as would be the case, for instance, for a generally cylindrical balloon. In alternative embodiments, FIG. 10 can be modified to adjust the relative angle between the laser beam 124 and the work piece to drill generally orthogonally extending orifices in workpieces which has a surface which is angled relative to the path of the laser beam, including without limitation a workpiece having a generally conical shape. Rotation of the workpiece can be accomplished by a number of methods, including the additional of an additional rotational adjustment of the workpiece stage to allow the local area of the surface of the workpiece to be drilled to be aligned at a right angle to the path of the laser beam. Alternatively, the laser and associated optics could be mounted on a gantry or carriage system for rotating the laser about the workpiece. In certain embodiments, orifices can be drilled in a conical or other angled or curved surface using the method and apparatus described in commonly owned U.S. Pat. No. 7,812,280, which is incorporated herein by reference in its entirety.

Figure 12:
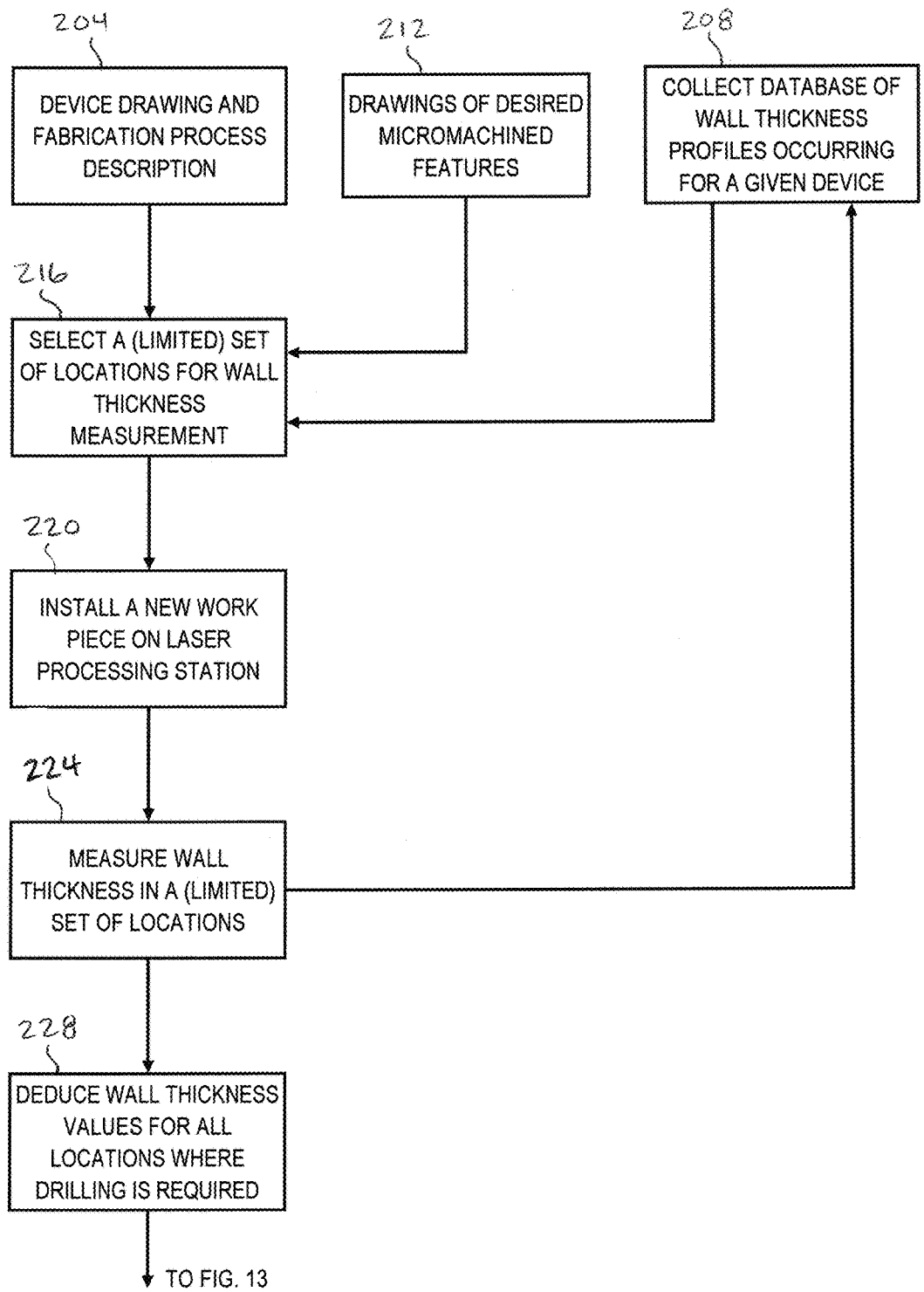
FIG. 12 is a flow diagram illustrating an exemplary method for determining a wall thickness profile.

With reference now to FIG. 12, there appears an exemplary method for determining the wall thickness values for all locations with drilling is required. In some embodiments, the pre-processing mapping of the wall thickness of sections of a work piece may be accomplished by employing various methods for determining, collecting and/or analyzing the specific thickness dimensions of the wall. In some embodiments, the wall thickness can be deduced based one or more factors, for example, by providing drawings and a description of the fabrication process of the device to be machined (step 204).

For example, in certain embodiments, the wall thickness, w, at different positions in the balloon is known or can be inferred based on a description of the balloon forming process or the balloon shape, provided at step 204. For example, in the case of a balloon having a conical shape, the thickness variation is pre-determined by the balloon forming process, e.g., wherein the wall thickness at neck area is thicker than at body area. Additionally or alternatively, thickness variations for a given device may be based on previously collected wall thickness profiles occurring for a device, e.g., based on prior analysis or measurement of representative samples of a given device, collected, and stored at step 208.

Figure 1A:
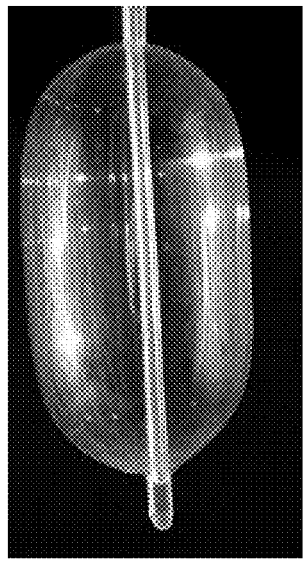
FIGS. 1A-1D show four examples of conventional catheter balloons.
Figure 1B:
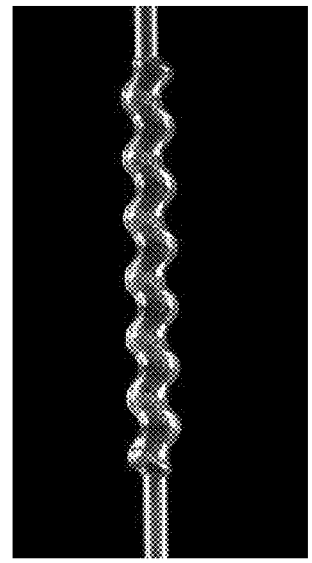
Figure 1C:
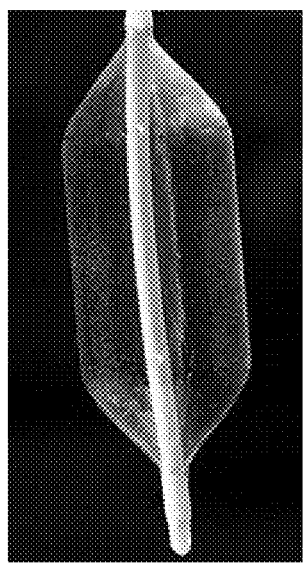
Figure 1D:
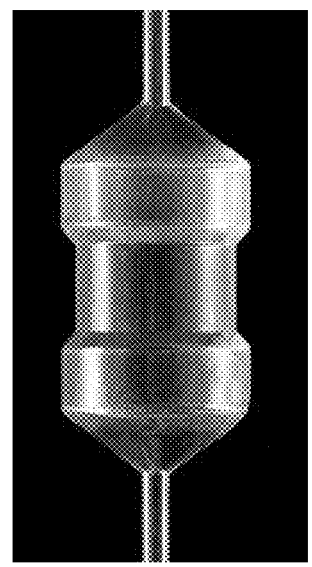
Figure 2:
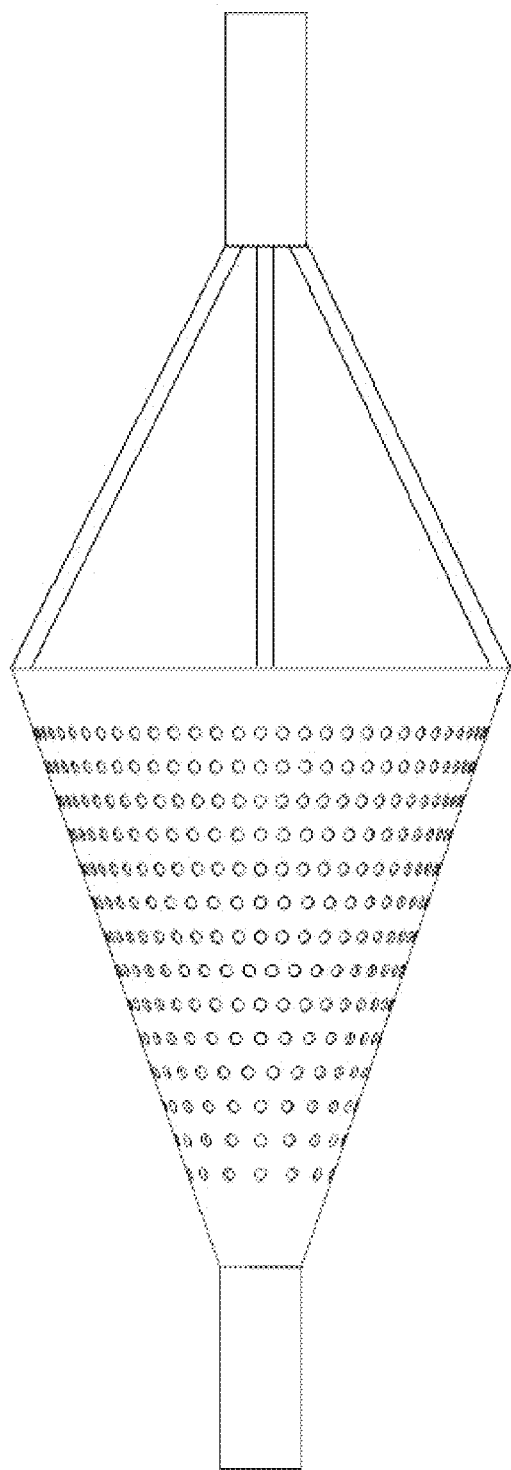
FIG. 2 illustrates a prior art conical balloon having multiple orifices uniformly positioned about the left side of the balloon.
Figure 3:
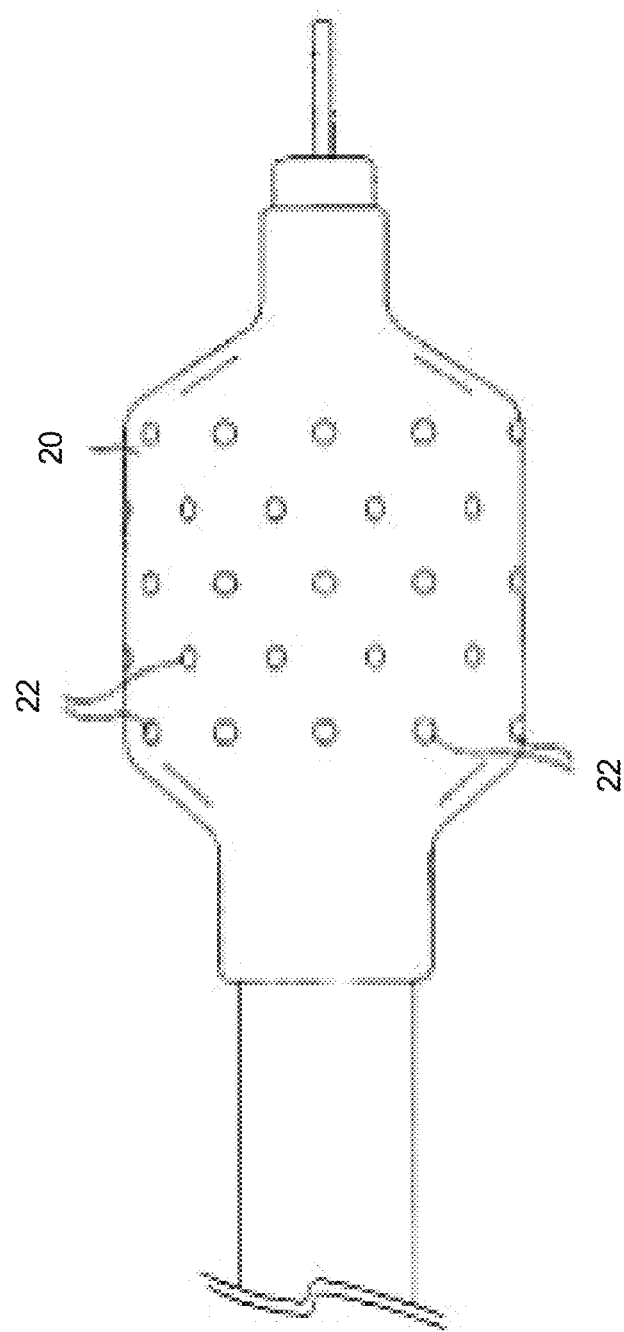
FIG. 3 shows a prior art cylindrical balloon having multiple orifices uniformly positioned about a middle portion of the balloon.
Figure 4:
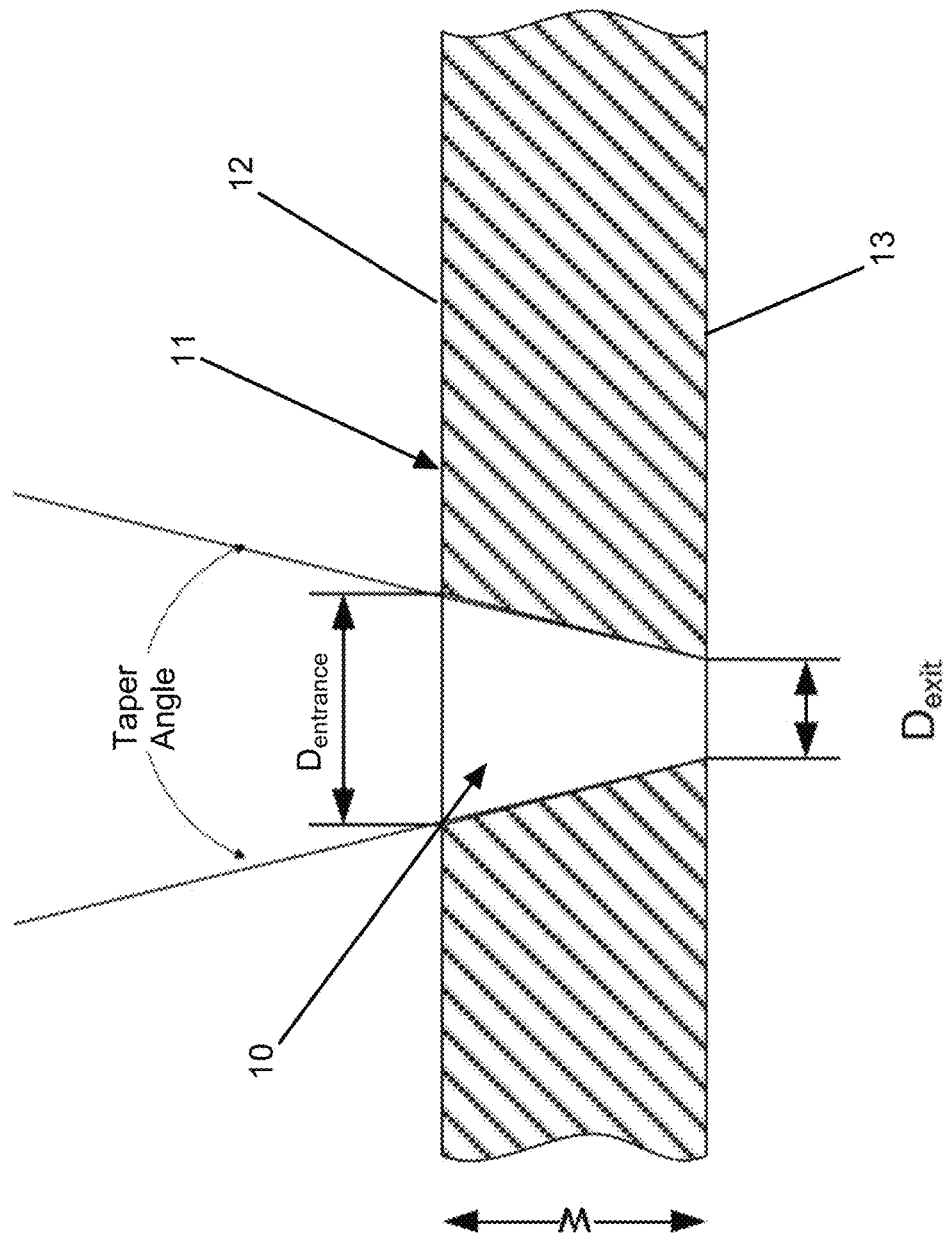
FIG. 4 illustrates an orifice provided within the wall of work piece and having entrance and exit diameters different from each other so as to form a taper angle.
Figure 5:
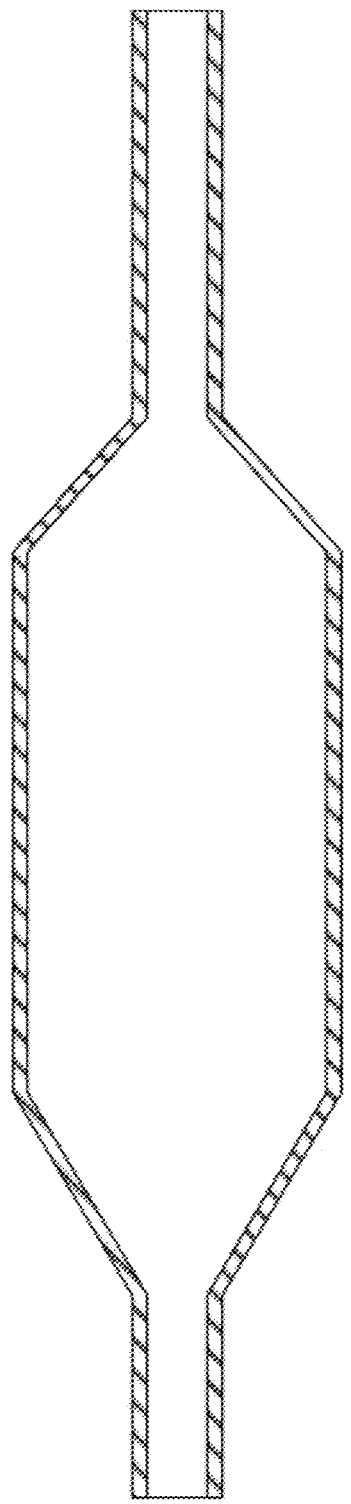
FIG. 5 illustrates an exemplary "ideal" catheter balloon having uniform wall thickness.
Figure 6:
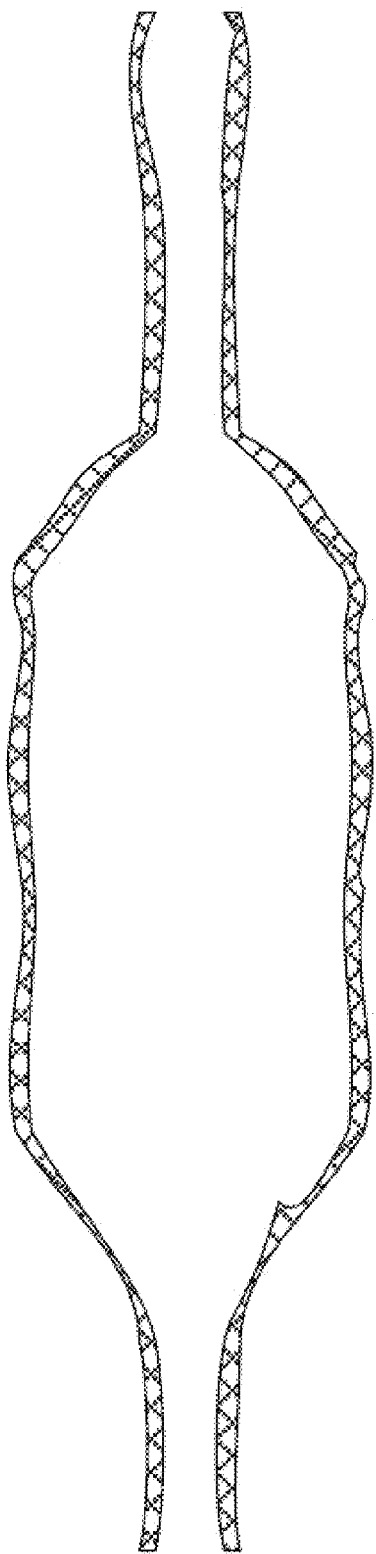
FIG. 6 shows an exemplary "real world" catheter balloon having non-uniform wall thickness.
Figure 7:
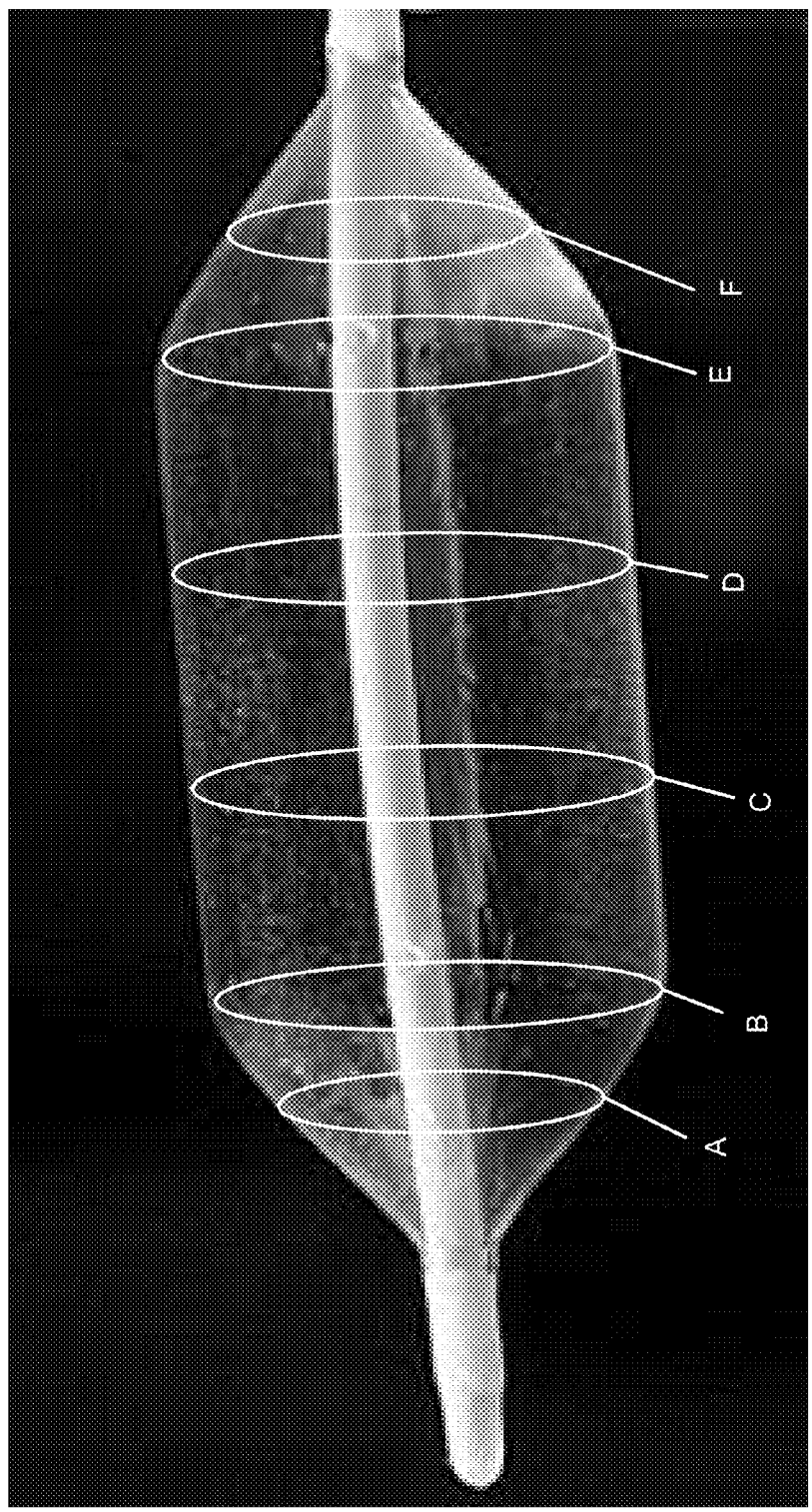
FIG. 7 illustrates an exemplary cylindrical catheter balloon and the location of six axial positions A-F where wall thickness measurements are taken to generate a thickness map.
Figure 9:
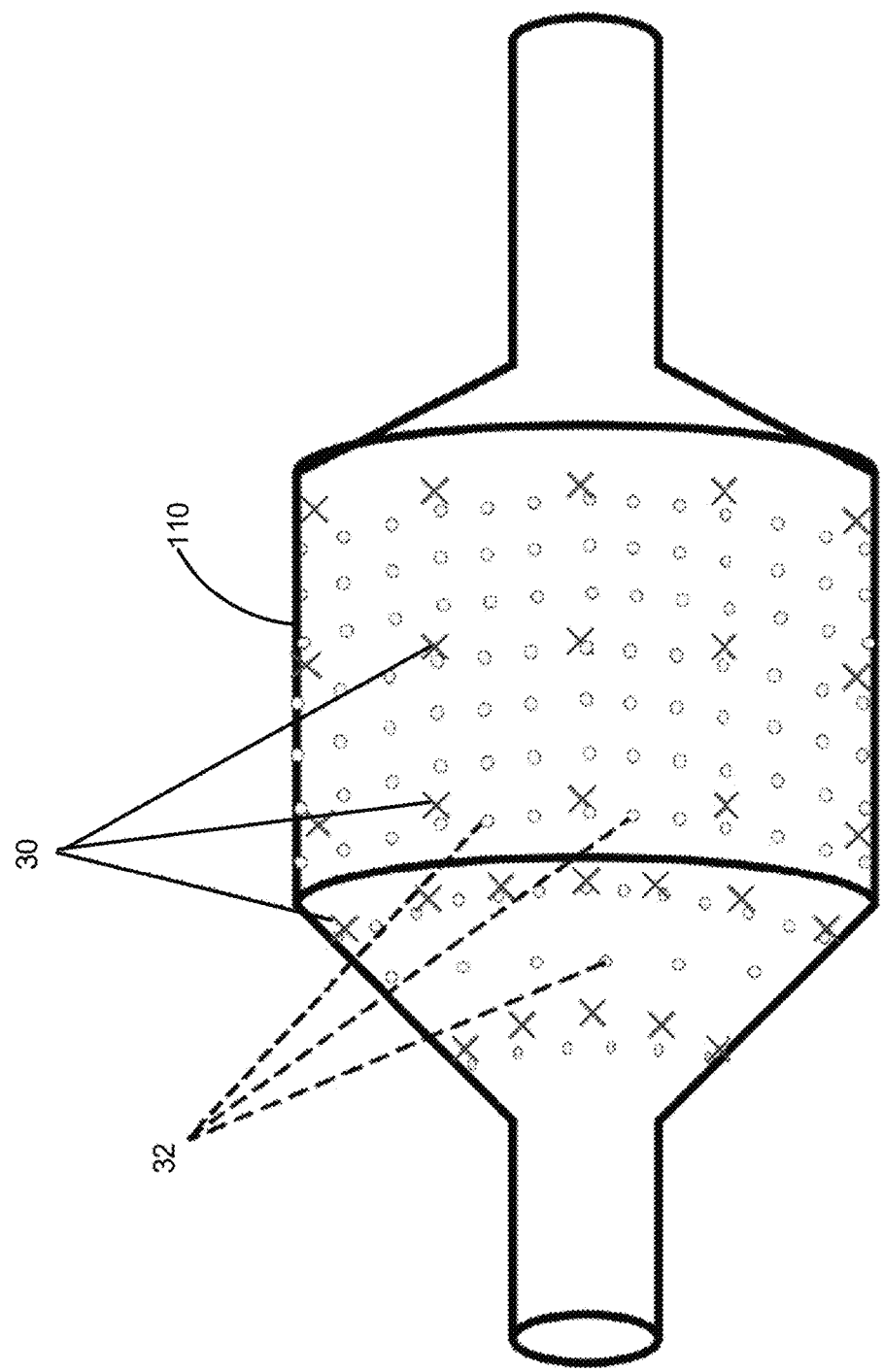
FIG. 9 depicts an exemplary cylindrical catheter balloon showing a limited number of locations where wall thickness measurements relative to the locations where an orifice is to be drilled.

In some embodiments, a set of locations on the work piece is selected for wall measurement thickness at step 216. It is not necessary to select locations that coincide with the locations of the orifices to be drilled and preferably, a limited set of locations is selected. As illustrated in FIG. 9, a set of measurement locations 30 on the work piece 110 are selected, which is less than the number of locations 32 where orifices are to be drilled.

With continued reference to FIG. 12, after the set of locations 240 for wall thickness measurements is made at step 216, a work piece 110 is installed on the laser processing workstation at step 220. At step 224, the wall thickness is measured at the locations (240) selected at step 216. The wall thickness measurements at step 224 can be used to deduce wall thickness for all locations 244 where orifices are to be drilled.

The wall thickness measurements at the selected set of locations may be made in a number of ways. Referring to FIG. 10, in certain embodiments, an image of the work piece 110 may be obtained using an imaging apparatus, which may include without limitation, a camera 150, an associated part imaging lens 152, and an imaging processor 154. Additionally or alternatively, a light detection system may include a light detector 160 for the detection of rays 162 emitted from an illumination source 164, which may be an illumination laser or other light source, and reflected from a surface of the work piece 110. In the illustrated embodiment, a collector 166 receives the reflected rays 162 and transmits them as an optical signal via an optical fiber cable 168.

The imaging apparatus and/or light detection system may have capabilities to provide surface and/or profile imaging of the wall of a work piece and, in particular, to denote non-uniformities in wall thickness. In some embodiments, the profile of the work piece may be observed from several azimuthal directions. In addition or alternatively, in some embodiments, the work piece may be rotated about its axis and monitored so as to detect dynamic misbalance and deduce wall thickness asymmetry therefrom. The wall thickness profiles determined by imaging representative samples may be stored in the wall thickness profile database at step 208.

In some embodiments, the camera 150 and/or light detector may be connected to an image processing unit and a CPU 136, which may process and analyze the image data obtained for the work piece and convert this data into dimensional information. This dimensional information may be presented in a table format, mapped onto the balloon surface as a 3D data array, or both.

In some embodiments, this method may involve preparing a detailed mapping of wall thickness, w, for a series of representative work pieces. The wall thickness maps generated by the representative samples may be stored in a database, look up table, or other electronic file for use in the ablation process for other, like work pieces. Although mapping representative samples may be a time-consuming procedure, it need only be performed once. According to some embodiments, this mapping may be performed by any suitable optical technology, including without limitation, optical non-contact interferometric technology available from Lumetrics Inc.

Again, in some embodiments, a sufficiently detailed map of wall thicknesses can be generated using a reduced set of wall measurements taken at key reference locations in sections of a work piece to allow prediction at step 228 of the wall thickness at the locations on the work piece where orifices are to be drilled e.g., by interpolating between measured values and/or taking into account the overall shape of the work piece and other factors affecting the thickness variation during manufacturing.

It will be recognized that in cases where a wall thickness profile has been previously determined for a given device, steps 216 and step 224 may be omitted and multiple work pieces of the given device type may be machined using the previously generated map. In some embodiments, however, it may be desirable to measure the wall thickness at a set of locations for a large number of work pieces of the same type, even in cases where a previously generated wall thickness map has been created, in order to test and confirm the validity of the thickness mapping algorithm and/or further adjust the wall thickness map for the given device. In some embodiments of the present invention, the number of measurements that are taken to generate the thickness map for a given work piece will be based on a number of factors, including the amount of time required, the desired accuracy of the predicted map, the economic parameters of the laser drilling process, the tolerances required for the diameters of the orifices to be drilled, and others.

Figure 13:
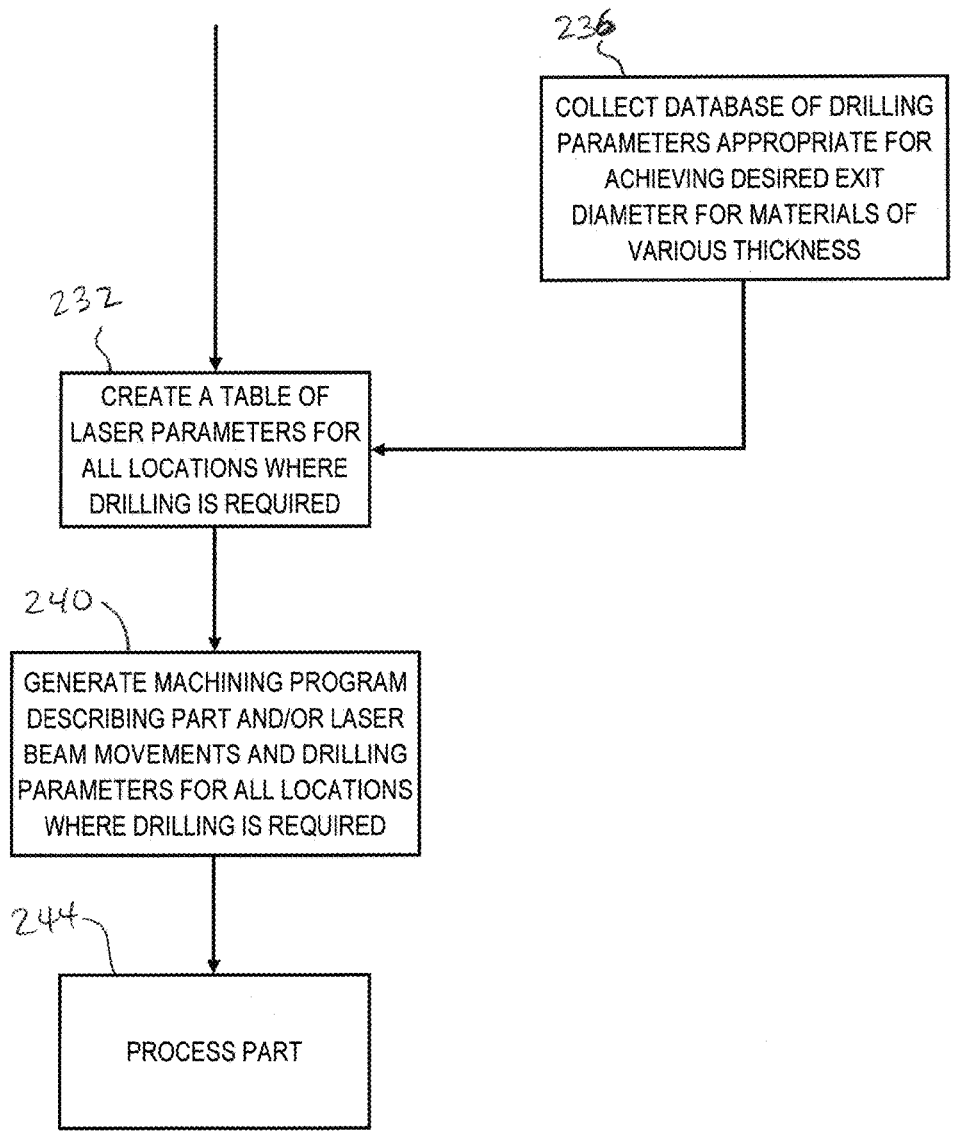
FIG. 13 is a flow diagram illustrating an exemplary first method for machining a work piece to achieve orifices having desired exit diameters for a work piece having a varying wall thickness.

Referring now to FIG. 13, after the wall thickness values are determined for all locations where drilling is required at step 228, the operating parameters for the laser 128 are determined for all locations where drilling is required, which may be stored in a table at step 232. The laser operating parameters are selected to compensate for the determined or deduced variations in wall thickness to achieve orifices having a desired exit diameter. The table of laser operating parameters may be created using operating parameters that have been predetermined and stored in a database at step 236. The database of laser drilling parameters associates laser drilling parameters with exit size and material thickness.

Once the laser drilling parameters to achieve a desired exit diameter have been stored in the table at step 236, a machining program is generated at step 240. Laser operating parameters that may be adjusted responsive to variations in wall thickness to achieve an orifice having a desired exit diameter include, but are not limited to, (i) the number of pulses delivered to the target (in the case of a pulsed laser) or the duration of laser exposure (in the case of a continuous-wave, or CW, laser), (ii) laser pulse repetition rate, (iii) laser energy and/or laser beam fluence delivered to the work piece or (iv) the size of the image of the laser beam on the work piece (in the case of a mask projection laser machining configuration) or the scanning beam path on the work piece (in the case of a direct-write laser machining configuration).

Figure 11A:
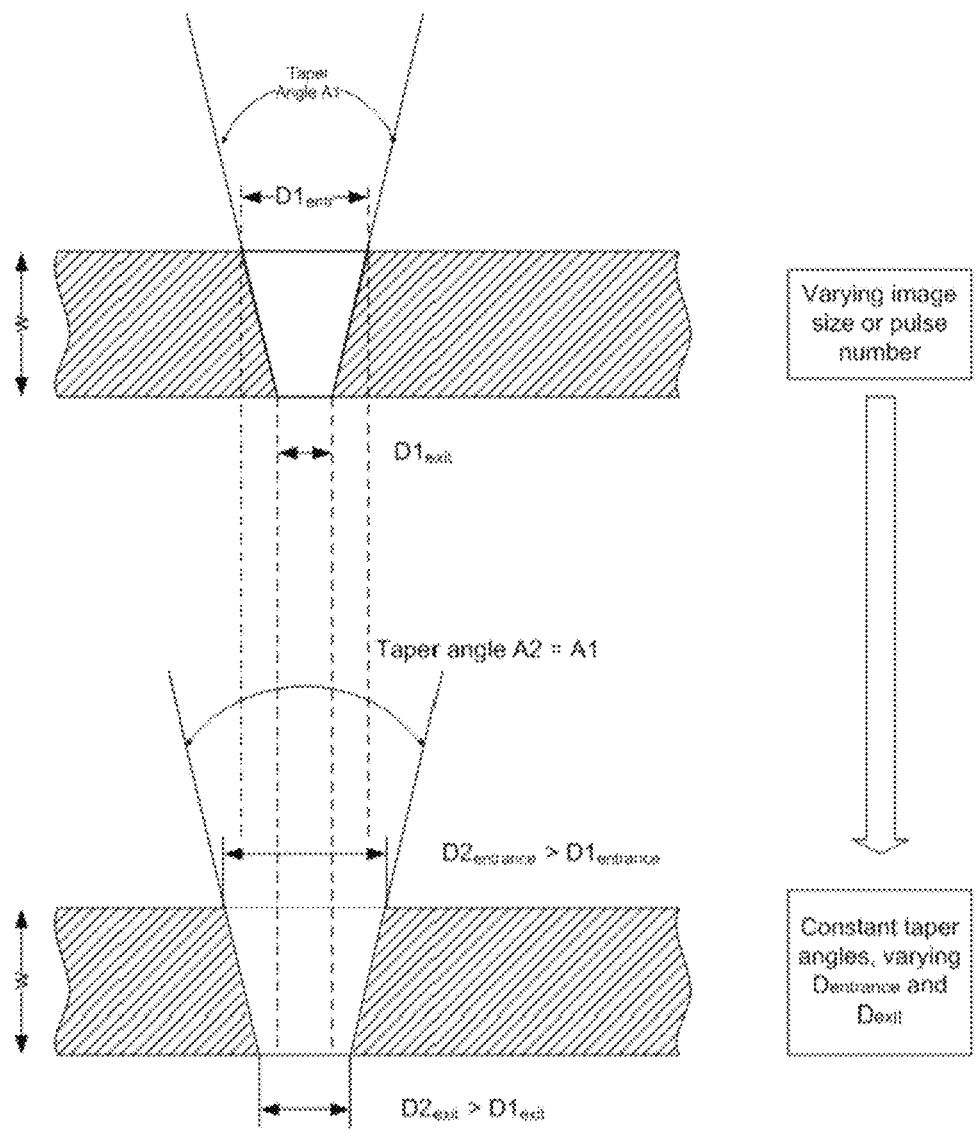
FIG. 11A illustrates the manner in which varying pulse number or image size of the laser beam affects the taper angle and the exit and entrance diameters of the orifices.
Figure 11B:
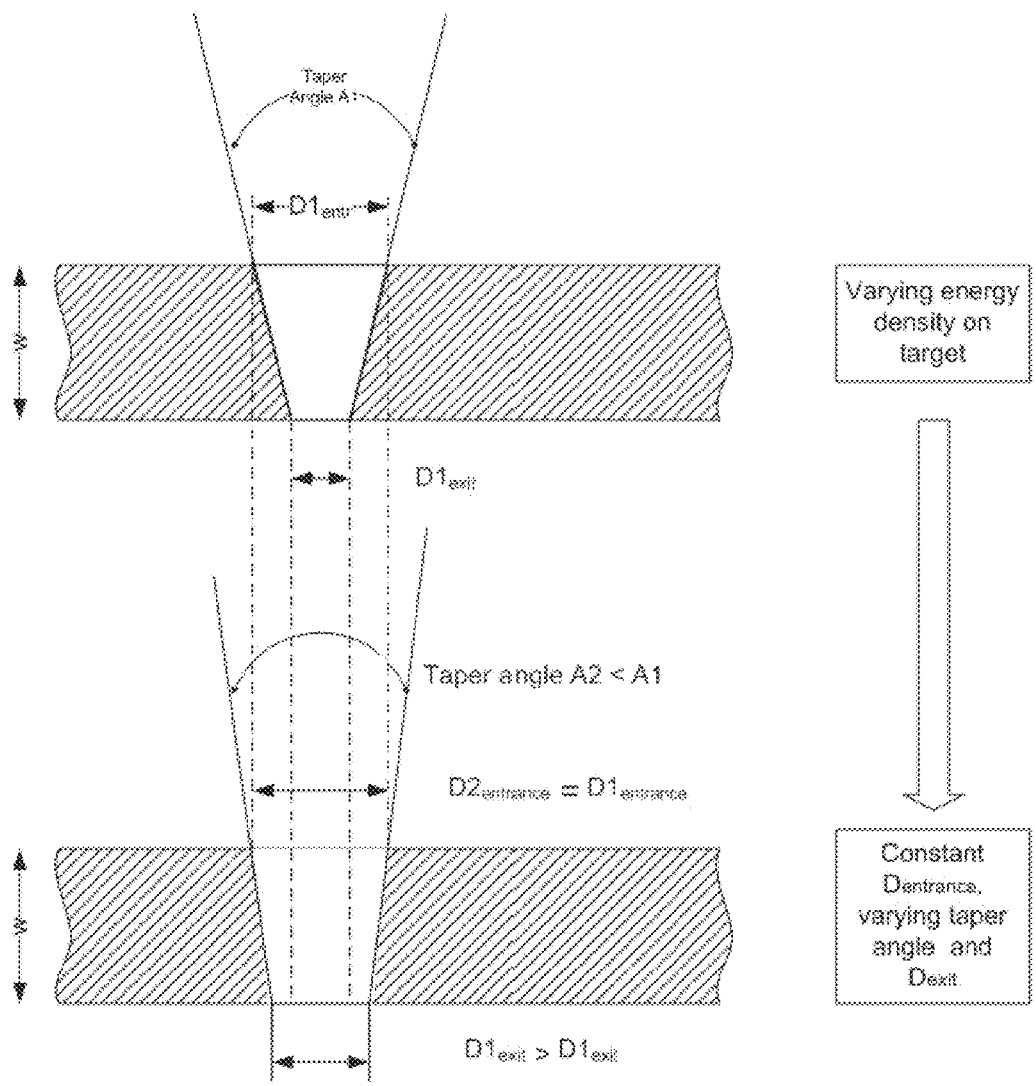
FIG. 11B illustrates the manner in which varying energy density of the laser beam affects the taper angle and the exit and entrance diameters of the orifices.

Referring now to FIGS. 11A and 11B, FIG. 11A illustrates the simplified effect of varying the number of pulses or image size (in the case of drilling using mask projection technique) on the entrance diameter, exit diameter, and taper angle. Specifically, increasing the number of pulses or increasing the projected image size results in an increased exit diameter and increased entrance diameter, with the taper angle remaining approximately constant. FIG. 11B illustrates the effect of varying the on-target energy density on the entrance diameter, exit diameter, and taper angle. Specifically, increasing the energy density of the laser beam results in an increased exit diameter and decreased taper angle, with the entrance diameter remaining approximately constant. Real-life behavior of laser drilling is somewhere between two extreme cases described by FIGS. 11A and 11B, but the mentioned parameters (number of pulses, projected image size and energy density) are available to adjust to compensate for varying wall thickness in order to achieve the desired orifice diameter (entrance or exit).

In certain embodiments, a higher pulse repetition frequency (PRF) may be employed during the initial or early stage of drilling an orifice to improve process throughput and switch to a lower PRF for precise control of the exit diameter.

Referring now to FIG. 10, the laser 128 emits laser pulses 124 to be delivered to the work piece to be processed. A laser pulse energy controller 170 adjusts the laser pulse energy and a laser pulse timing controller 172 adjusts the pulse repetition frequency in accordance with the required drilling parameters. A variable laser attenuator 174, which may be for example, motorized wheel with a set of partially-transmitting filters, or a set of tiltable partial reflectors, adjusts the intensity of the laser pulses 124 to an intensity as prescribed by the drilling parameters.

Beam steering optics, illustrated as a folding mirror 182 in the depicted embodiment, may be provided to direct the beam along a desired path to the work piece 110. It will be recognized that additional means for delivering or steering the laser beam pulses 124 along the desired optical path may also be employed as would be understood by those skilled in the art, including but not limited to prisms, mirrors, lenses, optical fibers, optical crystals, or other reflective, refractive, or diffractive optical components, and arrangements and combinations thereof.

After the beam pulses 182 are attenuated to a desired energy level by the attenuator 174, the attenuated pulses are passed to a beam forming optical system 184 which converts the intensity profile of the beam 124 to a desired ablation profile. The beam forming optical system 184 may include one or more reflective, refractive, or diffractive optical elements or a combination thereof. In the illustrated embodiment, the laser beam pulses 124 having a desired ablation profile are delivered to the work piece 110 via a dichroic mirror 186, which reflects the beam 124 toward the work piece 110 while allowing rays reflected from the work piece to pass to the part imaging lens 152 for imaging by the camera 150.

With reference again to FIG. 13, at step 244, the work piece 110 is processed under control of the machining program generated at step 240, which may be executed by the processor 136, to produce the orifices in the work piece 110 having the desired exit diameters. Once the orifices are drilled at all of the desired locations, the work piece 110 is removed. In certain embodiments wherein like work pieces are to be processed, the process may return to step 220 (see FIG. 12) wherein a new work piece is installed on the workstation and the process may repeat using the machining program generated at step 240 for processing a plurality of similar work pieces.

Figure 14:
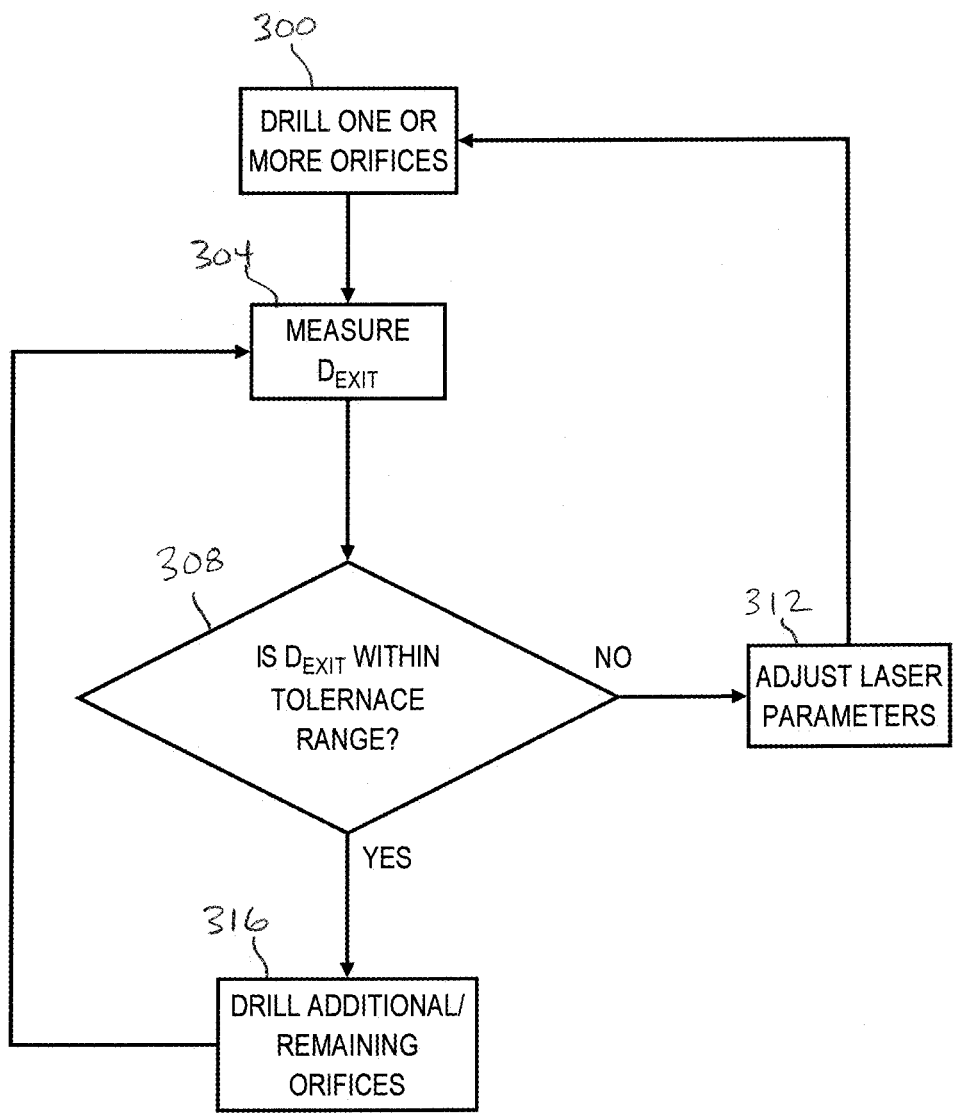
FIG. 14 illustrates an exemplary method for monitor the actual exit diameter to ensure that, for a given measured or predicted wall thickness, orifices drilled have an exit diameter, $D_{exit}$, within an acceptable, e.g., predetermined, tolerance range between an upper tolerance limit and a lower tolerance limit.

In certain embodiments, the work piece is processed at step 244 in accordance with the generated machining program until the orifices have been drilled at all of the locations where drilling is required. Alternatively, in other embodiments, it is contemplated that the laser drilling parameters are dynamically adjusted during the ablation process. For example, in certain embodiments, it may be desired to monitor the actual exit diameter to confirm the accuracy of the thickness map, e.g., to ensure that, for a given measured or predicted wall thickness, orifices drilled have an exit diameter, $D_{exit}$, within an acceptable, e.g., predetermined, tolerance range between an upper tolerance limit and a lower tolerance limit. A flow diagram illustrating such an embodiment appears in FIG. 14. At step 300, at least one orifice is drilled in the work piece a location where drilling is required. At step 304, the exit diameter is measured and at step 308, it is determined whether the exit diameter is within a predetermined tolerance range. If the exit diameter is not within the predefined tolerance range at step 308, the table of laser parameters created at step 236 (see FIG. 13) is adjusted at step 312 and the process returns to step 300 and continues as described above. If the exit diameter is within the predefined tolerance range at step 308, the process continues to step 316 and the remaining orifices are drilled.

In other alternative embodiments, it may be desirable to monitor the exit diameters of the orifices and dynamically adjust the laser parameters in a mask projection configuration where the part design calls for different hole diameters on the same mask to compensate for the thickness difference. For example, in the case of mask projection machining of a work piece wherein thickness variation is predetermined by the balloon forming process, different hole diameters may be provided on the same mask to compensate for the predetermined thickness variation. For example, in the case of a conical-shaped work piece the wall thickness decreases from the neck to the body and different size hole diameters may be provided on the mask design. In such embodiments, dynamically adjusting the laser parameters for the different sized hole diameters in the mask during the machining process is also contemplated.

Method 2—Monitoring and Determining Local Wall Thickness Data Before Drilling

Figure 15:
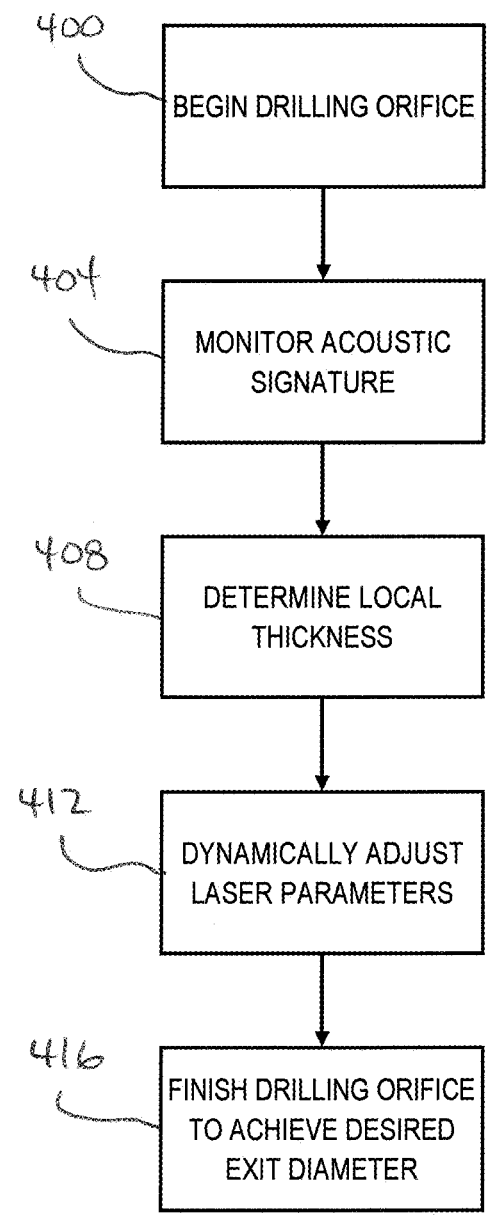
FIG. 15 is a flow diagram illustrating an exemplary second method, wherein the early stage of drilling each orifice is monitored and data is collected on the local wall thickness in a particular section of the wall of a work piece.

Another technique in accordance with the present disclosure for precisely machining one or more exit diameters, $D_{exit}$, in a thin-walled device using laser ablation is illustrated in the flow diagram appearing in FIG. 15, in which the early stage of drilling each orifice is monitored and data is collected on the local wall thickness in a particular section of the wall of a work piece. After such data is collected, some embodiments of this technique provide for adjusting the operating laser parameters during subsequent drilling of the same orifice in accordance with the previously observed local wall thickness data to manufacture precisely-controlled exit diameters, $D_{exit}$, in the work piece.

In certain embodiments, the process is repeated at each position where an orifice is to be drilled. In other embodiments, the process is performed at a limited number of representative locations on the work piece, wherein a thickness map is generated and utilized to infer wall thickness at other locations where drilling is required.

At step 400, drilling the orifice is begun with an initial set of laser parameters. In some embodiments, laser drilling of one or more orifices in a work piece using this method may begin by employing laser operating parameters based on an entire range of possible wall thicknesses, and preferably using a set of operating parameters that are generally lower than or similar in value to those used for wall thicknesses previously observed during the local wall thickness monitoring phase. In doing so, it is possible to provide for a precisely-controlled exit diameter, $D_{exit}$, that does not exceed a specific desired value. According to some embodiments, the range of possible wall thicknesses may be established beforehand based on a series of representative work pieces.

Some embodiments of this method of the present invention may involve monitoring the acoustic signature or acoustic data of the laser ablation to determine local wall thickness (step 404). Laser ablation typically results in the rapid expulsion of material from the surface of the material being ablated into the space above. This expulsion is generally fast and energetic enough to create detectable acoustic excitation in the material or in the surrounding media (e.g., air). Thus, in some embodiments of the present invention, the reflection of the acoustic shock waves from the inner wall of the work piece may be detected and used to determine the magnitude of the shock wave reflections and, in turn, the wall thickness through which that shock wave propagated based on known acoustic properties of the particular material comprising the work piece.

The value or characteristics of the acoustic data or acoustic signature may be detected, identified, and measured or analyzed, according to some embodiments, using one or more sensors and/or other instruments capable of acoustic signal detection. For example, an acoustic transducer 190 (see FIG. 10) coupled to the processor 136 may be provided to convert an acoustic signal to an electronic signal. In preferred embodiments, these sensors and other instruments may be used in conjunction with a computer (e.g., the processor 136 in the laser machining workstation appearing in FIG. 10) or other digital signal processing circuitry to detect and monitor the acoustic signal and identify when that signal has changed.

At step 408, the detected acoustic data or signature is used to determine the local wall thickness, e.g., by comparing the acoustic data or acoustic signature to a database of previously collected and stored acoustic data or signatures. At step 412, the operating laser drilling parameters are adjusted in accordance with the local thickness determined at step 408 to provide, at step 416, a finished orifice having a desired exit diameter, $D_{exit}$. Operating parameters that may be adjusted at step 412 include, but are not limited to, those mentioned above with respect to embodiments of method 1. Furthermore, embodiments of this method 2 may also be integrated in a computer-controlled laser workstation generally as illustrated in FIG. 10 so that method steps may be automatically performed under programmed control, as described above with respect to embodiments of method 1. In certain embodiments, a higher pulse repetition frequency (PRF) may be employed during the initial or early stage of drilling an orifice to improve process throughput and switch to a lower PRF for precise control of the exit diameter, or vice versa.

Method 3—Pre-Drilling Sub-Sized Holes with End-Point Detection

Figure 16:
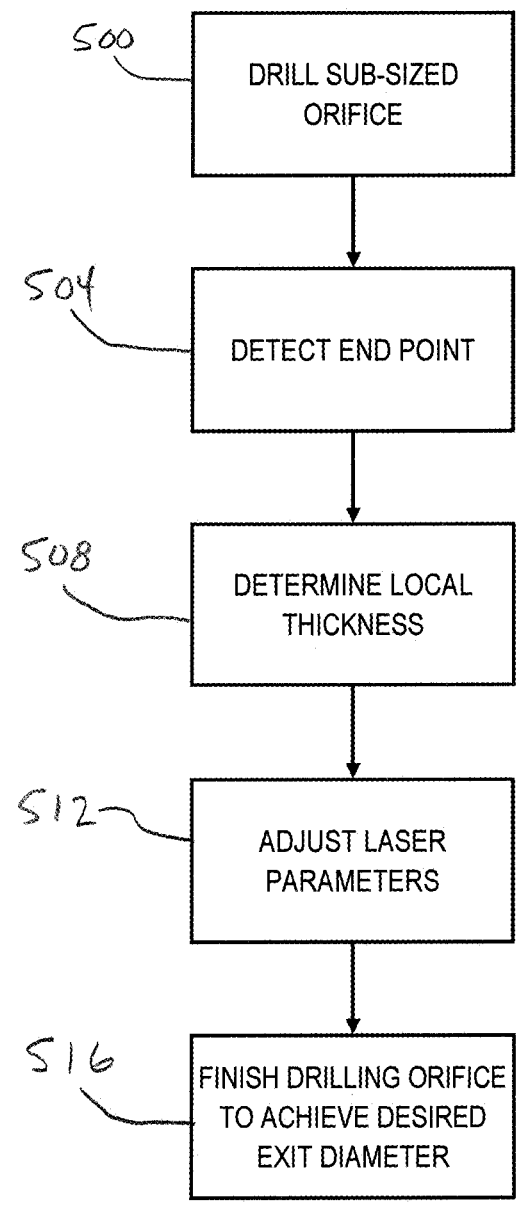
FIG. 16 is a flow diagram illustrating an exemplary third method, wherein local wall thickness is determined by drilling one or more sub-sized orifices.
Figure 17:
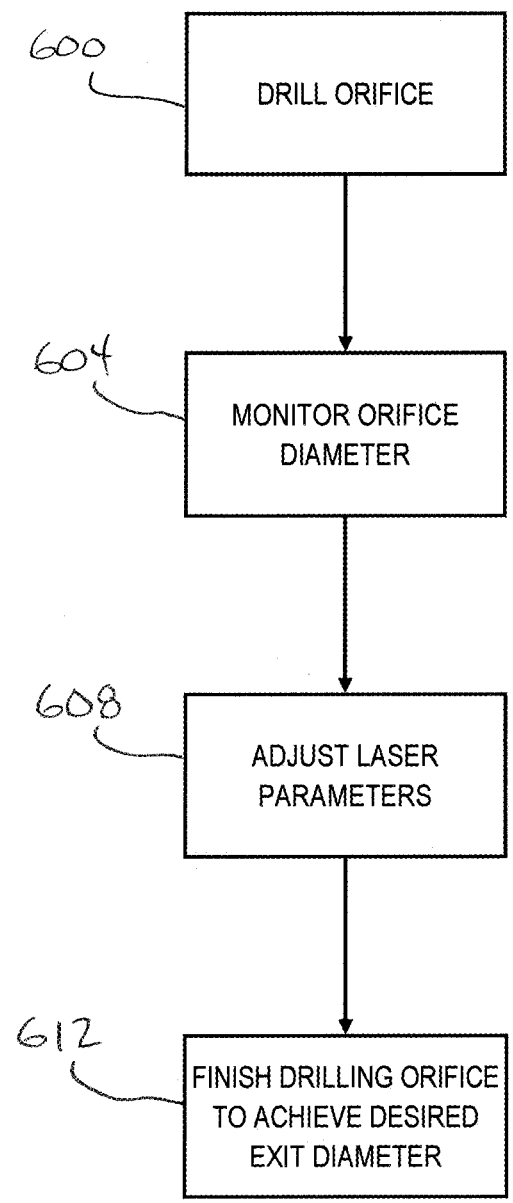
FIG. 17 is a flow diagram illustrating an exemplary fourth method wherein exit diameter is monitored during the ablation process.

Yet another technique in accordance with the present disclosure for precisely machining one or more exit diameters, $D_{exit}$, into a soft-material device using laser ablation is illustrated in the flow diagram appearing in FIG. 16. In the embodiment of FIG. 16, one or more sub-sized orifices (i.e., having an exit diameter that is less than the desired final exit diameter of the finished orifice) are drilled in a section of the wall of a work piece at step 500. Thereafter, at step 504, end-point detection data is collected and, at step 508, the end-point data is used to deduce the local wall thickness. After such end-point data is collected, some embodiments of this technique provide for adjusting the operating laser parameters during subsequent drilling at step 512, in accordance with the local wall thickness data previously determined at step 508, to manufacture precisely-controlled exit diameters, $D_{exit}$, in the work piece at step 516.

In certain embodiments, the process outlined in FIG. 16 is repeated at each position where an orifice is to be drilled. In other embodiments, the process is performed at representative locations on the work piece, wherein a thickness map is generated and utilized to infer wall thickness at other locations where drilling is required.

At step 500, the sub-sized orifice is drilled with an initial set of laser parameters. In some embodiments of this method, the initial set of laser parameters is pre-established based on a theoretical or empirical relationship between the wall thickness of a work piece and one or more laser drilling process parameters (e.g., the number of pulses needed to penetrate a wall of a given thickness). In some embodiments, laser drilling of one or more sub-sized orifices in a work piece using this method may employ operating parameters based on an entire range of possible wall thicknesses that are generally lower than or similar in value to those wall thicknesses previously observed during the local wall thickness monitoring process. In doing so, it is possible in some embodiments to provide for a precisely-controlled exit diameter, $D_{exit}$ that does not exceed a specific desired value. According to some embodiments, the range of possible wall thicknesses may be established beforehand based on a series of representative work pieces.

Some embodiments of this method 3 may incorporate end-point detection techniques at step 504, whereby the laser ablation process is monitored so as to detect the penetration of the laser beam through the wall of the work piece as soon as it occurs. These techniques involve detecting, measuring, and/or analyzing certain aspects of the laser ablation process that inherently occur during the ablation process and that provide an indication that the laser beam is no longer ablating the material intended to be removed and, instead, is now doing work on the other material or some other surrounding medium. End-point detection methods may include without limitation (i) monitoring of the ablation plume (e.g., size, intensity and/or spectral composition) or (ii) detecting acoustical signals associated with ablation shock waves (e.g., intensity and/or spectral and temporal characteristics). Acoustical signals can be detected directly in the work piece being processed or in the medium (e.g., air or process gas) nearby. These end-point detection methods and others are described in detail in commonly owned U.S. provisional patent application 61/360,045, entitled "Fine Control of Laser Ablation in Laser Micromachining," filed on Jun. 30, 2010, and commonly owned U.S. Pat. No. 8,772,671 entitled "Precision Laser Ablation," each of which is incorporated herein by reference in its entirety.

In preferred embodiments of this method 3, once an end-point event is detected at step 504, the wall thickness of the work piece at that specific location of end-point detection is deduced at step 508 based on the pre-established or previously observed theoretical or empirical relationship between the wall thickness and the one or more laser drilling process parameters, such as the number of pulses needed to penetrate a wall of a given thickness.

In certain embodiments, once the wall thickness has been determined at step 508, the operating laser drilling parameters are adjusted at step 512 in accordance with the determined thickness and the orifice is further drilled at step 516 to provide a finished orifice having a desired exit diameter, $D_{exit}$. Operating parameters that may be adjusted include, but are not limited to, those mentioned above with respect to embodiments of method 1. Furthermore, embodiments of method 3 may also be integrated in a computer-controlled laser workstation generally as illustrated in FIG. 10, so that method steps may be automatically performed under programmed control, as described above with respect to embodiments of method 1. In certain embodiments, a higher pulse repetition frequency (PRF) may be employed during the initial or early stage of drilling an orifice to improve process throughput and switch to a lower PRF for precise control of the exit diameter, or vice versa.

Method 4—Measuring Orifice Exit Diameters During Drilling

Another technique in accordance with the present disclosure for precisely machining one or more exit diameters, $D_{exit}$, into a soft-material device using laser ablation is illustrated in the flow diagram appearing in FIG. 13. In the embodiment of FIG. 13, the laser drilling of each orifice or a group of orifices at step 600 is monitored at step 604 so that the diameter of the orifice is measured as it is being drilled. The monitoring may occur in real time or near-real time during the drilling operation or at periodic time intervals during the drilling operation. After the orifice diameter measurements are obtained, some embodiments of this technique provide for adjusting the operating laser parameters at step 608 during subsequent drilling in accordance with these measurements to manufacture precisely-controlled, desired exit diameters, $D_{exit}$, in the work piece. In some embodiments, laser drilling of one or more orifices in a work piece using this method may employ operating parameters based on an entire range of possible wall thicknesses that are generally lower than or similar in value to those wall thicknesses previously observed during the local wall thickness monitoring process. In doing so, it is possible in some embodiments to provide for a precisely-controlled exit diameter, $D_{exit}$, that does not exceed a specific desired value. According to some embodiments, the range of possible wall thicknesses may be established beforehand based on a series of representative work pieces.

Some embodiments of this method may employ one or more automated vision methods for monitoring one or more orifices being drilled in the wall of a work piece. This can be performed, for example, using a high-resolution, high-speed camera coaligned with the ablating laser beam. In some embodiments, automated vision recognition software, which may run as a program of instructions in the computer 136, and which may receive image information from the camera 150 and associated imaging optics 152, may be used to provide a measurement of the diameters of the blind holes and/or exit diameters that are less than the desired exit diameter after the laser beam has fully penetrated through the wall.

Once the diameter has been determined, embodiments of this method provide for adjustment of the operating laser drilling parameters at step 608 such that for a given measured diameter of the blind hole and/or measured exit diameter, subsequent drilling of the orifice provides one or more orifices of a desired exit diameter, $D_{exit}$. Operating parameters that may be adjusted include, but are not limited to, those mentioned above with respect to embodiments of method 1. Furthermore, embodiments of method 4 may also be integrated in a computer-controlled laser workstation so that method steps may be automatically performed under programmed control, as described above with respect to embodiments of method 1.

In some embodiments of the present invention, it may be beneficial to optimize laser drilling operating parameters differently for early stages than for later finishing stages, e.g., to employ high pulse repetition rate (PRF) at early stages to achieve high throughput and lower PRF at the finishing stage to effect more precise control of an orifice exit diameter, $D_{exit}$, or vice versa.

Furthermore, as an example of combining one or more of the above-described methods, an embodiment of method 3 (drilling a sub-sized orifice to establish local wall thicknesses) may be used with method 1 for mapping the wall thickness of a work piece at appropriate locations and then applying appropriate algorithms to predict the sufficiently detailed map of wall thicknesses of sections of a work piece where orifices are to be drilled, and for adjusting operating laser drilling parameters, such that for a given measured or predicted wall thickness an orifice of desired exit diameter, $D_{exit}$ may be drilled.

For illustration purposes, the methods and apparatuses in accordance with the present disclosure have been shown and described by way of reference to functional components or modules. It will be recognized that such modules may be implemented as programs or sets of instructions resident in the memory of a single computer-based information handling system, such as a dedicated computer based information handling system or general purpose computer system. Alternatively, such functional modules may be stored on and or performed using a plurality of such information handling systems.

Until required by the information handling system, the sets of instructions may be stored in another readable memory device, for example in a hard disk drive or in a removable memory. Further, the set of instructions can be stored in the memory of a computer-based information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, or optically, so that the medium carries computer readable information.

Exemplary embodiments of the systems and methods have been described herein. As noted elsewhere, these embodiments have been described for illustrative purposes only and are not limiting. Other embodiments are possible and are covered by the invention. Such embodiments will be apparent to persons of ordinary skill in the relevant art(s) based on the teachings contained herein. Thus, the breadth and scope of the disclosure should not be limited by any of the above-described preferred embodiments.

What is claimed is:

1. A method for drilling precise orifices in a wall of non-uniform thickness, the method comprising:
    creating a thickness profile of at least a portion of the wall;
    irradiating the wall with at least one laser beam to ablate a portion of the wall to thereby form an orifice in the wall, wherein during the irradiation one or more parameters of the at least one laser beam are adjusted one or more times in accordance with the thickness profile to compensate for the non-uniform thickness of the wall; and
    the orifice fully penetrating the wall and having an entrance opening in a first surface of the wall, an exit opening in a second surface of the wall opposite the first surface, and a tapered sidewall, wherein the one or more parameters of the at least one laser beam are adjusted to produce a desired diameter of the exit opening.

2. The method of claim 1, wherein the one or more parameters are selected from the group consisting of: the number of pulses delivered to the wall, the duration of laser exposure to the wall, the laser pulse repetition rate, the laser energy, the laser beam fluence, the size of the area on the wall instantaneously exposed to a laser beam, the size of the image of a scanning laser beam path, and any combination thereof.

3. A method for drilling one or more orifices in a work piece having a wall of non-uniform thickness, the method comprising:
    retrieving data representative of a thickness profile of at least a portion of the wall;

processing the retrieved data to generate a table of one or more laser operation parameters, the laser operation parameters selected to compensate for variations in the thickness profile;

controlling a laser to generate a laser beam;

irradiating the wall with the laser beam to ablate a portion of the wall to thereby form an orifice in the wall, wherein the laser beam is controlled in accordance with the generated table of laser operating parameters to compensate for the non-uniform thickness of the wall; and the orifice fully penetrating the wall and having an entrance opening in a first surface of the wall, an exit opening in a second surface of the wall opposite the first surface, and a tapered sidewall, wherein the generated table of laser operating parameters is configured to produce a desired diameter of the exit opening.

4. The method of claim 3, wherein the one or more laser operation parameters are selected from the group consisting of: the number of pulses delivered to the wall, the duration of laser exposure to the wall, the laser pulse repetition rate, the laser energy, the laser beam fluence, the size of the image of a laser beam, the size of the image of a scanning laser beam path, and any combination thereof.

5. The method of claim 3, wherein the work piece is a catheter balloon.

6. The method of claim 3, further comprising:
creating the thickness profile based on one or more of: (a) measurements of wall thickness at one or more locations on the work piece; (b) measurements of wall thickness at one or more locations on one or more devices that are similar to the work piece; (c) a shape of the work piece; and (d) a fabrication process used to manufacture the work piece.

7. The method of claim 6, wherein the measurements of wall thickness are taken at a number of locations that is less than the number of said one or more orifices to be drilled in the work piece.

8. The method of claim 6, wherein the measurements of wall thickness are made using optical non-contact interferometry.

9. The method of claim 3, wherein the step of irradiating the wall comprises:
(a) irradiating a first location of the wall to generate first orifice having a first exit diameter;
(b) prior to irradiating a second location of the wall, adjusting the one or more laser operating parameters; and
(c) irradiating the second location of the wall to generate a second orifice having a second exit diameter, wherein the one or more laser operating parameters are adjusted at step (b) so that the second exit diameter is equal to the first exit diameter.

10. A method for drilling precise orifices in a wall of non-uniform thickness, the method comprising:
irradiating at least a portion of the wall with a laser beam during a first time period;
monitoring localized areas of the wall during the first time period to determine one or more thicknesses of the wall in the localized areas; and
continuing to irradiate the wall during a second time period, wherein during the second time period, one or more parameters of the laser beam are adjusted one or more times in accordance with said one or more thicknesses determined during the first time period of irradiation to compensate for the non-uniform thickness of the wall, and further wherein said one or more parameters of the laser beam are adjusted to generate an orifice having a tapered sidewall, the orifice fully penetrating the wall and having a desired exit diameter.

11. The method of claim 10, wherein said monitoring localized areas of the wall during the first time period comprises one or both of:
monitoring an acoustic signal emitted from the wall; and
analyzing an acoustic signature emitted from the wall.

12. The method of claim 10, wherein said at least a portion of the wall is irradiated during the first time period with an initial set of one or more operating parameters that are selected based on an entire range of possible wall thicknesses that are generally lower than or similar in value to previously observed wall thicknesses.

13. The method of claim 10, further comprising:
irradiating said at least a portion of the wall during the first time period with a first set of one or more operating parameters, wherein the first set of one or more operating parameters provides a first rate of ablation of material from the wall during the irradiation; and
irradiating said at least a portion of the wall during the second time period with a second set of one or more operating parameters, wherein the second set of one or more operating parameters provides a second rate of ablation of material from the wall during the irradiation which is different from the first rate of ablation.

14. The method of claim 13, wherein the first rate of ablation is greater than the second rate of ablation.

15. A method for drilling a precise orifice in a wall of non-uniform thickness, the method comprising:
ablating a location of the wall by operating a laser with a first set of one or more operating parameters to irradiate said location with a laser beam;
detecting one or more characteristics of said ablating to determine whether the laser beam has fully penetrated the wall to form a sub-sized orifice, the sub-sized orifice having an exit diameter less than a desired exit diameter;
if the laser beam has fully penetrated the wall to form the sub-sized orifice, determining a thickness of the wall at said location based the first set of operating parameters; and
operating the laser with a second set of one or more operating parameters in accordance with the determined thicknesses to compensate for the non-uniform thickness of the wall, wherein said second set of one or more operating parameters are selected to generate an orifice having a tapered sidewall, the orifice fully penetrating the wall and having a desired exit diameter.

16. The method of claim 15, wherein the laser is operated with the second set of one or more operating parameters until an orifice is generated having said desired exit diameter.

17. The method of claim 15, wherein said detecting is accomplished by a technique selected from the group consisting of: monitoring an ablation plume, detecting acoustical signals associated with ablation shock waves, or a combination thereof.

18. The method of claim 15, wherein the first set of one or more operating parameters is selected based on an entire range of possible wall thicknesses that are generally lower than or similar in value to previously observed wall thicknesses.

19. The method of claim 15, wherein the first set of one or more operating parameters provides a first rate of ablation of material from the wall during the irradiation and the second set of one or more operating parameters provides a second rate of ablation of material from the wall during the irradiation which is different from the first rate of ablation.

20. The method of claim 19, wherein the first rate of ablation is greater than the second rate of ablation.

21. A method for drilling precise orifices in a wall of non-uniform thickness, the method comprising:
   irradiating at least a portion of the wall with a laser beam to form one or more orifices in the wall, each of the one or more orifices having a tapered sidewall;
   at periodic time intervals during said irradiating, measuring an exit diameter of the one or more orifices; and
   adjusting one or more parameters of the at least one laser beam during said irradiating in accordance with one or more measurements of the exit diameters of the one or more orifices to accommodate the non-uniform thickness of the wall, wherein the one or more parameters of the at least one laser beam are adjusted to generate said one or more orifices fully penetrating the wall, wherein said one or more orifices in the wall have a desired exit diameter.

22. The method of claim 21, wherein the exit diameter of the one or more orifices is measured using automated vision recognition software.

23. A system for drilling precise orifices in a work piece, the work piece having a wall of non-uniform thickness, the system comprising:
   a laser for irradiating at least a portion of the wall;
   a processor having a program of instructions thereon configured to control one or more operating parameters of the laser; and
   the program of instructions further configured to identify non-uniformities in the wall thickness and to adjust said one or more operating parameters to compensate for the non-uniformity in the thickness of the wall, wherein said one or more operating parameters of the laser are adjustable to generate an orifice having a tapered sidewall, the orifice fully penetrating the wall and having a desired exit diameter.

24. The system of claim 23, further comprising:
   means for engendering relative rotational movement between the laser and the work piece; and
   means for engendering relative translational movement between the laser and the work piece.

25. The system of claim 23, wherein the one or more operating parameters are selected from the group consisting of: the number of pulses delivered to the wall, the duration of laser exposure to the wall, the laser pulse repetition rate, the laser energy, the laser beam fluence, the size of the area on the wall instantaneously exposed to a laser beam, the size of the image of a scanning laser beam path, and any combination thereof.

26. The system of claim 23, further comprising an electronic memory storing data representative of a thickness profile of at least a portion of the wall.

27. The system of claim 23, wherein the program of instructions is further configured to:
   (a) irradiate a first location of the wall to generate first orifice having a first exit diameter;
   (b) prior to irradiating a second location of the wall, adjust the one or more laser operating parameters; and
   (c) irradiate the second location of the wall to generate a second orifice having a second exit diameter, wherein the one or more laser operating parameters are adjusted at step (b) so that the second exit diameter is equal to the first exit diameter.

28. The system of claim 23, wherein the program of instructions is further configured to:
   irradiate at least a portion of the wall with a laser beam during a first time period;
   monitor localized areas of the wall during the first time period to determine one or more thicknesses of the wall in the localized areas; and
   continue to irradiate the wall during a second time period, and to adjust the one or more operating parameters one or more times in accordance with said one or more thicknesses determined during the first time period of irradiation to compensate for the non-uniform thickness of the wall.

29. The system of claim 28, further comprising:
   an acoustic transducer for generating an electronic signal representative of an acoustic signal generated in response to irradiating the wall; and
   said program of instructions configured to perform one or both of monitoring the electronic signal and analyzing the electronic signal.

30. The system of claim 23, wherein said program of instructions is configured to control operation of the laser to irradiate the wall during a first time period with an initial set of one or more operating parameters that are selected based on an entire range of possible wall thicknesses that are generally lower than or similar in value to previously observed wall thicknesses.

31. The system of claim 23, wherein said program of instructions is configured to control operation of the laser to:
   irradiate said at least a portion of the wall during the first time period with a first set of one or more operating parameters, wherein the first set of one or more operating parameters provides a first rate of ablation of material from the wall during the irradiation; and
   irradiate said at least a portion of the wall during a second time period with a second set of one or more operating parameters, wherein the second set of one or more operating parameters provides a second rate of ablation of material from the wall during the irradiation which is different from the first rate of ablation.

32. The system of claim 31, wherein the first rate of ablation is greater than the second rate of ablation.

33. The system of claim 23, wherein the program of instructions is configured to:
   ablate a location of the wall by operating a laser with a first set of one or more operating parameters to irradiate said location with a laser beam;
   detect one or more characteristics of the ablation to determine whether the laser beam has fully penetrated the wall to form a sub-sized orifice, the sub-sized orifice having an exit diameter less than the desired exit diameter;
   if the laser beam has fully penetrated the wall to form the sub-sized orifice, determine a thickness of the wall at said location based the first set of operating parameters; and
   operate the laser with a second set of one or more operating parameters in accordance with the determined thicknesses to compensate for the non-uniform thickness of the wall.

34. The system of claim 33, wherein the program of instructions is further configured to operate the laser with the second set of one or more operating parameters until an orifice is generated having said desired exit diameter.

35. The system of claim 33, wherein the program of instructions is configured to monitor an ablation plume, detect acoustical signals associated with ablation shock waves, or both.

36. The system of claim 33, wherein the program of instructions is configured to select the first set of one or more operating parameters based on an entire range of possible wall thicknesses that are generally lower than or similar in value to previously observed wall thicknesses.

37. The system of claim 33, wherein the first set of one or more operating parameters is configured to provide a first rate of ablation of material from the wall during the irradiation and the second set of one or more operating parameters is configured to provide a second rate of ablation of material from the wall during the irradiation which is different from the first rate of ablation.

38. The system of claim 37, wherein the first rate of ablation is greater than the second rate of ablation.

39. The system of claim 23, wherein the program of instructions is configured to:
  irradiate said at least a portion of the wall with the laser beam to form one or more orifices in the wall;
  at periodic time intervals during the irradiating, measure an exit diameter of the one or more orifices; and
  adjust one or more parameters of the at least one laser beam during said irradiating in accordance with one or more measurements of the exit diameters of the one or more orifices to accommodate the non-uniform thickness of the wall.

40. The system of claim 39, wherein the program of instructions includes automated vision recognition software for measuring the exit diameter of the one or more orifices.

* * * * *